US012582935B2

(12) United States Patent
Spiteri et al.

(10) Patent No.: US 12,582,935 B2
(45) Date of Patent: Mar. 24, 2026

(54) METHOD FOR CAPTURE OF CARBON DIOXIDE FROM AMBIENT AIR AND CORRESPONDING ADSORBER STRUCTURES WITH A PLURALITY OF PARALLEL SURFACES

(71) Applicant: CLIMEWORKS AG, Zürich (CH)

(72) Inventors: Alexander Spiteri, Zürich (CH); Benjamin Megerle, Zürich (CH); Adelaide Calbry-Muzyka, Zürich (CH); Nathalie Casas, Zürich (CH); Jan André Wurzbacher, Zürich (CH)

(73) Assignee: CLIMEWORKS AG, Zurich (CH)

( * ) Notice: Subject to any disclaimer, the term of this patent is extended or adjusted under 35 U.S.C. 154(b) by 523 days.

(21) Appl. No.: 17/928,216

(22) PCT Filed: May 25, 2021

(86) PCT No.: PCT/EP2021/063939
§ 371 (c)(1),
(2) Date: Nov. 28, 2022

(87) PCT Pub. No.: WO2021/239747
PCT Pub. Date: Dec. 2, 2021

(65) Prior Publication Data
US 2023/0211276 A1      Jul. 6, 2023

(30) Foreign Application Priority Data

May 29, 2020    (EP) ..................................... 20177523
May 29, 2020    (EP) ..................................... 20177528

(51) Int. Cl.
*B01D 53/02*      (2006.01)
*B01D 53/04*      (2006.01)
(Continued)

(52) U.S. Cl.
CPC ..... *B01D 53/0407* (2013.01); *B01D 53/0462* (2013.01); *B01J 20/28004* (2013.01); (Continued)

(58) Field of Classification Search
CPC ............ B01D 2253/20; B01D 2253/25; B01D 2253/304; B01D 2253/34; B01D 2256/22; (Continued)

(56) References Cited

U.S. PATENT DOCUMENTS 4,234,326 A    11/1980  Bailey et al.
5,082,473 A     1/1992  Keefer
(Continued)

FOREIGN PATENT DOCUMENTS

DE        3030967 A1      3/1982
EP      2 874 727 B1     12/2017
(Continued)

OTHER PUBLICATIONS

International Search Report dated Jul. 23, 2021 in International Application No. PCT/EP2021/063939.
(Continued)

*Primary Examiner* — Christopher P Jones
(74) *Attorney, Agent, or Firm* — Sughrue Mion, PLLC

(57)      ABSTRACT

A DAC method as well as a unit containing an adsorber structure having an array of adsorber elements with a support layer and on both sides thereof a sorbent layer (1, 2), wherein the adsorber elements are parallel and spaced apart forming parallel fluid passages for flow-through of ambient atmospheric air and steam. The method involves the following sequential and repeating steps: (a) adsorption by flow-through; (b) isolating the sorbent; (c) injecting a stream of saturated steam through the parallel fluid passages and inducing an increase of the temperature; (d) extracting desorbed carbon dioxide from the unit and separating it from
(Continued)

required

| (1) Adsorption with ambient air | (2) Isolation from ambient |  | (5) Heat-up with steam | (6) Purge with steam |  | (8) Break isolation / re-press. |

| (3) Evacuation of reactor | (4) Flushing with steam |  | (7) Vacuum cool / dry |  | (9) Air-dry | optional steam; (e) bringing the sorbent material to ambient temperature conditions wherein in step (a) the speed of the air is in the range of 2-8 m/s, and wherein at least in step (d) the speed of the steam is at least 0.2 m/s.

14 Claims, 12 Drawing Sheets

(51) Int. Cl.
B01J 20/28 (2006.01)
B01J 20/34 (2006.01)

(52) U.S. Cl.
CPC ... B01J 20/28035 (2013.01); B01J 20/28038 (2013.01); B01J 20/28052 (2013.01); B01J 20/3466 (2013.01); B01D 2253/20 (2013.01); B01D 2253/25 (2013.01); B01D 2253/304 (2013.01); B01D 2253/34 (2013.01); B01D 2257/504 (2013.01); B01D 2259/40077 (2013.01); B01D 2259/4009 (2013.01); B01D 2259/45 (2013.01)

(58) Field of Classification Search
CPC .... B01D 2257/504; B01D 2259/40077; B01D 2259/4009; B01D 2259/45; B01D 53/0407; B01D 53/0462; B01J 20/28004; B01J 20/28035; B01J 20/28038; B01J 20/28052; B01J 20/3466; Y02C 20/40
See application file for complete search history.

(56) References Cited

U.S. PATENT DOCUMENTS

| | | | | |
|---|---|---|---|---|
| 6,364,938 | B1 * | 4/2002 | Birbara | A62B 11/00 |
| | | | | 95/139 |
| 6,451,095 | B1 | 9/2002 | Keefer et al. | |
| 6,692,626 | B2 | 2/2004 | Keefer et al. | |
| 7,288,136 | B1 | 10/2007 | Gray et al. | |
| 7,645,324 | B2 | 1/2010 | Rode et al. | |
| 8,500,854 | B1 | 8/2013 | Pennline et al. | |
| 8,834,822 | B1 | 9/2014 | Gay et al. | |
| 11,766,636 | B1 * | 9/2023 | Besarati | B01D 53/0462 |
| | | | | 95/90 |

| | | | | |
|---|---|---|---|---|
| 2006/0289003 | A1 * | 12/2006 | Lackner | B01D 53/1475 |
| | | | | 128/200.24 |
| 2007/0149398 | A1 | 6/2007 | Jones et al. | |
| 2011/0088550 | A1 | 4/2011 | Tirio | |
| 2011/0179948 | A1 | 7/2011 | Choi et al. | |
| 2011/0296872 | A1 | 12/2011 | Eisenberger | |
| 2012/0076711 | A1 | 3/2012 | Gebald et al. | |
| 2013/0312606 | A1 | 11/2013 | Eisenberger | |
| 2014/0004016 | A1 | 1/2014 | Eisenberger et al. | |
| 2014/0096684 | A1 | 4/2014 | Ogino | |
| 2014/0130670 | A1 | 5/2014 | Eisenberger et al. | |
| 2015/0139862 | A1 | 5/2015 | Chen et al. | |
| 2015/0209718 | A1 | 7/2015 | Eisenberger | |
| 2018/0214822 | A1 * | 8/2018 | Eisenberger | B01J 20/262 |
| 2018/0272266 | A1 | 9/2018 | Sprachmann et al. | |
| 2023/0211276 | A1 * | 7/2023 | Spiteri | B01J 20/28052 |
| | | | | 95/139 |
| 2023/0241546 | A1 * | 8/2023 | Brouillette | B01D 53/83 |
| | | | | 95/107 |

FOREIGN PATENT DOCUMENTS

| | | | |
|---|---|---|---|
| GB | 1296889 | A | 11/1972 |
| WO | 2009/014292 | A2 | 1/2009 |
| WO | 2009/067625 | A1 | 5/2009 |
| WO | 2009/155539 | A2 | 12/2009 |
| WO | 2010/022339 | A2 | 2/2010 |
| WO | 2010/027929 | A1 | 3/2010 |
| WO | 2010/096916 | A1 | 9/2010 |
| WO | 2010/151271 | A1 | 12/2010 |
| WO | 2011/049759 | A1 | 4/2011 |
| WO | 2012/168346 | A1 | 12/2012 |
| WO | 2014/063046 | A1 | 4/2014 |
| WO | 2014/170184 | A1 | 10/2014 |
| WO | 2016/005226 | A1 | 1/2016 |
| WO | 2016/037668 | A1 | 3/2016 |
| WO | 2016/038339 | A1 | 3/2016 |
| WO | 2018/083109 | A1 | 5/2018 |
| WO | 2018/085927 | A1 | 5/2018 |
| WO | 2018/210617 | A1 | 11/2018 |

OTHER PUBLICATIONS

Written Opinion of the International Searching Authority dated Jul. 23, 2021 in International Application No. PCT/EP2021/063939.
European Application No. 20 186 310.7 filed Jul. 16, 2020.
European Application No. 20 181 440.7 filed Jun. 22, 2020.

* cited by examiner required (1) Adsorption with ambient air (2) Isolation from ambient (3) Evacuation of reactor (4) Flushing with steam (5) Heat-up with steam (6) Purge with steam (7) Vacuum cool / dry (8) Break isolation / re-press.

(9) Air-dry optional

FIG. 1

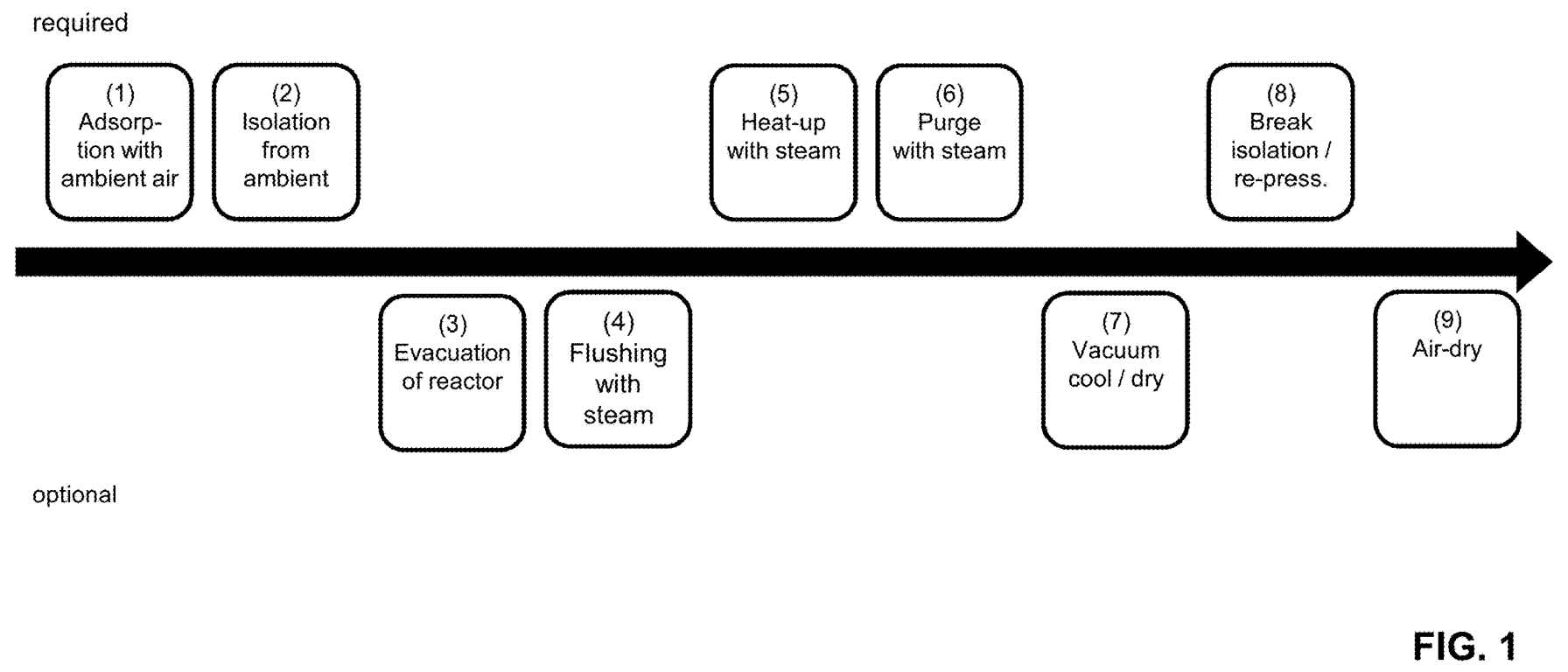

----- cumulative adsorption CO2 uptake [mmol/g]

—— relative outlet CO2 concentration [outlet ppm/ inlet ppm]

METHOD FOR CAPTURE OF CARBON DIOXIDE FROM AMBIENT AIR AND CORRESPONDING ADSORBER STRUCTURES WITH A PLURALITY OF PARALLEL SURFACES

CROSS REFERENCE TO RELATED APPLICATIONS

This application is a National Stage of International Application No. PCT/EP2021/063939, filed May 25, 2021, claiming priorities to European Patent Application No. 20 177 523.6, filed May 29, 2020 and European Patent Application No. 20 177 528.5, filed May 29, 2020.

TECHNICAL FIELD

The present invention relates to a method for the adsorption and desorption of a sorbent used in cyclical adsorption-desorption for the capture of carbon dioxide, $CO_2$, directly from ambient atmospheric air or highly dilute sources, as well as to uses of such a method and devices for such a method. The present invention further relates to an optimized configuration of an adsorber structure with a multitude of parallel surfaces for the efficient capture of carbon dioxide from ambient air as well as uses thereof.

PRIOR ART

Gas separation by adsorption/desorption processes, more specifically the capture of carbon dioxide from atmospheric air, which is known as direct air capture (DAC), is a field of growing importance as a potential measure aimed at reducing the impact of greenhouse gases. The conditioning of atmospheric air and $CO_2$ during adsorption is generally not a feasible option energetically at the prevalent $CO_2$ concentrations and adsorption conditions; however, the conditions under which contact with the sorbent material occurs can be influenced by the configuration of the adsorber structure. Furthermore, the conditions that lead to desorption of $CO_2$ from the sorbent are significantly more varied and complex- and these are generally based on the broad knowledge base on other industries in the gas separation field. Widely established capture of $CO_2$ from flue gases can generally rely solely on a substantial change in $CO_2$ partial pressure or system temperature to initiate a release of $CO_2$ by the sorbent. DAC working with lower $CO_2$ concentrations must however combine various measures of shifting the sorbent $CO_2$ uptake equilibrium to achieve economically attractive working capacities. Therefore, newer methods specifically for the purpose of desorption in direct air capture processes have emerged and continue to emerge, along with adsorber structure innovations.

Generally, flue gas $CO_2$ separation processes aim for mostly complete removal of $CO_2$ from the flue gas, with capture fractions larger than 80%. Therefore, configurations maximize contact with the sorbent and gas stream with pressure drop and pumping work being of secondary concern. Typical configurations include packed bed columns or fluidized beds with typical lengths of several ten centimeters to several meters, which typically impose pressure drops of several thousand Pascal up to several bars on the gas flow.

More recently, structured adsorbers have also been employed for capturing $CO_2$ from flue gas, such as the structures described by WO-A-2010096916 and WO-A-2018085927 and WO-A-2010096916, that specify parallel passage contactors for the purpose of flue gas $CO_2$ capture.

These adsorber structures in their configuration for flue gas capture are designed for the high concentrations of $CO_2$ present in flue gas and operate with the aim of capturing a high fraction of $CO_2$ from the flue gas.

More specifically, WO-A-2018085927 discloses an adsorptive gas separation apparatus and method. The adsorbent structure may include a first adsorbent layer having at least a first adsorbent material, a second adsorbent layer including at least a second adsorbent material, and a barrier layer, where the barrier layer is interposed between the first adsorbent layer and the second adsorbent layer. A parallel passage contactor including a plurality of adsorbent structures each comprising a barrier layer, and arranged to form first and second fluid passages is also disclosed. An adsorption process for separating at least a first component from a multi-component fluid stream using the adsorbent structure is also provided.

US-A-2015139862 discloses a structured adsorbent sheet, including a nano-adsorbent powder, and a binder material, wherein the nano-adsorbent powder is combined with the binder material to form an adsorbent material, and a porous electrical heating substrate, wherein the adsorbent material is applied to the porous electrical heating substrate thereby forming a structured adsorbent sheet. A structured adsorbent module is provided, including a plurality of stacked structured adsorbent sheets, configured to produce a plurality of fluid passages, wherein the plurality of fluid passages have a cross-sectional shape in the direction of a fluid stream. The structured adsorbent module may have a cross-sectional shape that is trapezoidal, rectangle, square, triangular or sinusoidal. A structured adsorbent bed is provided, including a plurality of modules, stacking the modules, thereby providing a plurality of process fluid passages, and a process fluid inlet and a process fluid outlet, in fluid communication with the plurality of process fluid.

US-A-2012076711 discloses a structure containing a sorbent with amine groups that is capable of a reversible adsorption and desorption cycle for capturing $CO_2$ from a gas mixture wherein said structure is composed of fiber filaments wherein the fiber material is carbon and/or polyacrylonitrile.

However, the low ambient concentration of $CO_2$ in direct air capture means that much larger volumes of air need to be moved through the adsorber structure at ambient conditions, and thus flue gas capture configurations cannot be used due to the high pressure-drop across them. Therefore, for direct air capture $CO_2$ separation processes, configurations of the sorbent material are desired, which impose as little pressure drop on the air flow as necessary, in order to minimize the energy required for adsorption gas pumping, but at the same time achieve maximum contact between the sorbent and the gas stream in order to maximize the mass transfer rates of the components to be removed from the gas stream. These structures are very different from those required for flue gas capture. Such a structure for DAC is e.g. disclosed in WO-A-2014170184.

Various capture methods have recently been disclosed using adsorber structures specifically configured to direct air capture. One common approach is based on a cyclic adsorption/desorption process on solid, chemically functionalized sorbent materials. For example, US-A-2011041688 discloses carbon dioxide capture/regeneration structures and techniques using a fluidized bed of coated granular material. Various wall flow structures for low pressure drop flow across a bed of granular adsorbents are disclosed in WO-A-2018083109, WO-A-2018210617. Other solutions opt to use structured adsorbers such as the monoliths used in US-A-2014004016, or liquid solutions distributed across a contactor device such as in WO-A-2009155539 and WO-A-2010022339. Packed bed granular contactors generally aim to distribute the flow and thus reduce the velocity and increase the residence time of the adsorptive air flow in the bed, in order to counter the generally longer diffusion paths and therefore slower kinetics of these structures, as WO-A-2018083109, WO-A-2018210617. In contrast, structured adsorbers, such as WO-A-2010027929, WO-A-2010151271, and sorbents supported on support matrices, such as WO-A-2009067625, exhibit shorter diffusion paths and the residence time can therefore be lower by an order of magnitude, resulting in higher direct through flow velocities.

Structured sorbents made of multi-layer sheets of adsorbing material have been investigated in a number of applications. An early example is provided in U.S. Pat. No. 4,234,326 where construction of the parallel-flow filter consists of alternate layers of charcoal cloth and air permeable spacing. Further development of layered structured adsorbents for Hydrogen purification using rapid PSA is described in a number of patents. U.S. Pat. Nos. 5,082,473, 6,451,095, 6,692,626 describe equilibrium-controlled pressure swing adsorption (PSA) processes that may be enhanced by configuring the adsorbers as layered adsorbent laminate sheet parallel passage contactor structures, with the adsorbent material formed into adsorbent sheets, with or without suitable reinforcement materials incorporated into such sheets. Specific benefits for kinetic selectivity of these structures is discussed e.g. in detail in U.S. Pat. No. 7,645, 324 when including small pore sorbents into adsorbing sheets. An example of an air capture device including individual pairs of sheets forming a lamella designed to remove CO2 from flow is provided in WO-A-200914292.

Newer methods specifically for the purpose of desorption in direct air capture processes have provided energy to the sorbent by various other means, such as WO-A-2016005226, WO-A-2014170184, where the desorption methods combine temperature swings realized by use of heat exchangers with vacuum swings and steam purge gas flows. However—while conductive heating can be easily controlled, avoids near saturation instabilities (i.e. wet steam) and does not load sorbent materials with large amounts of liquid water—conductive heat transfer through typical granular beds of highly porous sorbents materials is commonly very poor. Furthermore, the heat exchangers displace sorbent material, thus considerably reducing output per unit volume. For structured adsorbers, such as monoliths, the integration of a heat exchanger is non-trivial and a challenge unto itself. Extensive heating and drying of the sorbent in this manner has also been shown to cause substantial degradation to the sorbent material, reducing $CO_2$ uptake capability and leading to an overall reduction in the sorbent operational lifetime. In combination with their high cost, such solutions are not necessarily economically feasible for the widespread application of DAC. Usage of steam for the regeneration of sorbents is not new, dating back several decades, such as indicated by GB-A-1296889 or DE-A-3030967. However, in an attempt to overcome the aforementioned issues for purposes of direct air capture, pure steam desorption processes have received increased attention in this field in recent years, see US-A-2014096684, US-A-2018214822, WO-A-2016038339, US-A-2011088550, WO-A-2014063046, US-A-2011179948, US-A-2015209718, EP-A-2874727, US-A-2007149398, US-A-2014130670, U.S. Pat. No. 7,288,136, WO-A-2016037668, US-A-2018272266 or U.S. Pat. No. 8,500,854. These are generally reference steam processes from other industries where both saturated and superheated steam is used for the regeneration of sorbents. Steam desorption methods allow for fast and uniform heating of the sorbent, with the innate drawback of substantial deposition of water in the sorbent materials, where these considerable amounts of additional water may impede the continued successful cycling of the material for the purpose of $CO_2$-capture. The addition of water may reduce the transport kinetics in porous sorbent materials, or potentially wash out the active phase rendering the sorbent material inactive for further capture of $CO_2$. The key to effective operation is therefore the combination of a process and sorbent material that allows for cyclic operation of the direct air capture plant.

Devices for such a process have also been disclosed. Aside from introducing steam from an external source into the reaction chamber, previously disclosed devices for such a desorption technique disclose, for example, a steam generation reservoir inside the sorbent chamber (US-A-2014096684, WO-A-2016005226) or describe the reuse of steam within a limited number of reaction chambers (US-A-2013312606).

The aspects relevant to cyclic operation include the conditions of adsorption, any preparation prior of the regeneration, the temperature and pressure level of regeneration as well as the conditions of the steam employed, and any post-regeneration steps. While some process-oriented disclosures describe a reduction of pressure or alternatively purge of air from within the reaction chamber (EP-A-2874727, WO-A-2016037668, US-A-2011296872), most leave this unaddressed. The condition of the steam employed is, if further disclosed at all, saturated steam (US-A-2013312606, U.S. Pat. No. 7,288,136).

The sorbent temperature during regeneration is of particular importance, as many common $CO_2$ sorbent systems show a rapid reduction in cyclical $CO_2$ capture capacity due to degradation, primarily driven by the exposure to sufficiently high temperatures and oxidation by the exposure to oxygen at sufficiently high temperatures. On the other hand, higher temperatures, in most sorbents, facilitate faster desorption rates and higher $CO_2$ desorption amounts.

US-A-2018214822 proposes a method for removing carbon dioxide directly from ambient air, using a sorbent under ambient conditions, to obtain relatively pure CO2. CO2 is removed from the sorbent using process heat, preferably in the form of steam, at a temperature in the range of not greater than about 130° C., to capture the relatively pure CO2 and to regenerate the sorbent for repeated use. Increased efficiency can be achieved by admixing with the ambient air, prior to contacting the sorbent, a minor amount of a preferably pretreated effluent gas containing a higher concentration of carbon dioxide. The captured carbon dioxide can be stored for further use, or sequestered permanently. The method provides purified carbon dioxide for further use in agriculture and chemical processes, or for permanent sequestration. The document only discloses flow speed values at the entrance opening of full sorbent structures but fails to disclose information about flow speed in the flow channels of sorbent structures.

SUMMARY OF THE INVENTION

The present invention relates to a method and a device for the adsorption and desorption of a sorbent used in cyclical adsorption-desorption for the capture of carbon dioxide, $CO_2$, directly from ambient atmospheric air, as well as to uses of such methods and devices.

Two defining aspects of the method are the essentially exclusive use or fully exclusive use of steam for the delivery of heating energy during the desorption process, as well as the use of a parallel passage contactor, exemplified in WO-A-2010096916, WO-A-2018085927 and WO-A-2010096916, but with a configuration and sorbent preferably optimized for direct air capture. In order to allow for efficient and economic cyclic operation, a multitude of further requirements as detailed is preferably complied with.

Suitable and preferred sorbent layer materials for use in the present method to act as sorbents suitable and adapted or even optimized for direct air capture have a process cyclical CO2 capacity in the range of 0.3 to 3 mmol/g and/or a water uptake of less than 70% of their own weight. They take the form of a solid material, which can be in the form of one or an assembly of contiguous layers/coatings or of particular nature (typically polymeric material), which is surface modified and/or porous to provide for carbon dioxide adsorption. The corresponding surface modification can be provided by impregnation, grafting and/or bonding of corresponding functionalities, in particular primary and/or secondary amine functionalities. The sorbent material can be an amine-functionalized solid adsorbent or X2CO3, wherein X is K, Na, Li or a mixture thereof, preferably impregnated onto a porous granular support, e.g. active carbon. For example, the material can be a weak-base ion exchange resin and/or amine-functionalized cellulose and/or amine-functionalized silica and/or amine-functionalized carbons and/or amine-functionalized metal organic frameworks and/or other amine-functionalized polymeric adsorbents. Another sorbent material suitable for use with this invention can be amine-functionalized cellulose as described in WO2012/168346. Such sorbents can contain different type of amino functionalization and polymers, such as immobilized aminosilane-based sorbents as reported in U.S. Pat. No. 8,834,822 or materials according to WO-A-2011/049759 describing an ion exchange material comprising an aminoalkylated bead polymer for the removal of carbon dioxide from industrial applications. Another possible sorbent is the one of WO-A-2016/037668 for reversibly adsorbing CO2 from a gas mixture, here the sorbent is composed of a polymeric adsorbent having a primary amino functionality. The materials can also be of the type as disclosed in EP 20 186 310.7 (incorporated by reference). Also, they can be of the type as disclosed in EP 20 181 440.7 (incorporated by reference), so materials where a solid inorganic or organic, non-polymeric or polymeric support material is functionalized on the surface with amino functionalities capable of reversibly binding carbon dioxide, with a specific BET surface area, in the range of 1-20 m2/g. The solid inorganic or organic, non-polymeric or polymeric support material can be an organic or inorganic polymeric support, preferably an organic polymeric support, in particular a polystyrene based material, preferably a styrene divinylbenzene copolymer, preferably to form the sorbent material surface functionalized with primary amine, preferably methyl amine, most preferably benzylamine moieties, wherein the solid polymeric support material is preferably obtained in an emulsion polymerization process, or can be a non-polymeric inorganic support, preferably selected from the group consisting of: silica (SiO2), alumina (Al2O3), titania (TiO2), magnesia (MgO), clays, as well as mixed forms thereof, such as silica-alumina (SiO2-Al2O3), or mixtures thereof.

The sorbent material generally, and/or in the above case the solid inorganic or organic, non-polymeric or polymeric support material, can be in the form of at least one of monolith, layer or sheet, hollow or solid fibres, preferably in woven or nonwoven structures, hollow or solid particles, or extrudates, wherein preferably it takes the form of preferably essentially spherical beads with a particle size (D50) in the range of 0.01-1.5 mm, preferably in the range of 0.30-1.25 mm, or the solid inorganic or organic, non-polymeric or polymeric support material is in the form of solid particles embedded in a porous or non-porous matrix. Preferred sorbent layer materials at the end of step (a) show a carbon dioxide loading in the range of 0.3-4 mmol/g, preferably in the range of 0.5-3.5 mmol/g, and/or they have a cyclic carbon dioxide capacity in the range of 0.1-3.5 mmol/g, preferably in the range of 0.3-3 mmol/g. Furthermore they preferably have a carbon dioxide uptake rate in the range of 0.5-10 mmol/g/h, preferably in the range of 1-6 mmol/g/h, preferably taken as the average over a time span of 5-10 mins. Further preferably, they have a water uptake of less than 70% by weight, preferably of less than 50% by weight.

Preferred support layers are based on metal, polymer, carbon, carbon molecular sieve and graphene material layers or layers based on combinations of these materials.

The adsorber structure as used in the present proposed method comprises a multitude of adsorber elements arranged in an array. Each adsorber element is a composite of a porous support layer or sheet and at least one sorbent layer attached to said porous support such that it is accessible from both sides of the adsorber element. The sorbent layer comprises or consists of at least one sorbent material, offering selective adsorption of $CO_2$ over other major non-condensable gases in air in the presence of moisture. In an alternate embodiment, the adsorber element comprises a carrier or support layer, with a first and second sorbent layer attached on either side of said carrier, each sorbent layer consisting of at least one sorbent material, offering selective adsorption of $CO_2$ over other major non-condensable gases in air in the presence of moisture or water vapor. The sheet or laminate design is optimized towards maximizing the fraction of active adsorbent (greater than 75% or greater than 60%) in order to reduce the overall volume of the contactor at fixed $CO_2$ capture capacity.

Additionally and preferably, the adsorber structure contains spacer elements to maintain open parallel passages throughout the structure while minimizing flow resistance through the contactor.

So generally speaking, a method is proposed for separating gaseous carbon dioxide from a gas mixture in the form of ambient atmospheric air, containing said gaseous carbon dioxide as well as further gases different from gaseous carbon dioxide by cyclic adsorption/desorption using a sorbent material adsorbing said gaseous carbon dioxide, using a unit containing an adsorber structure with said sorbent material. The adsorber structure can sustain temperatures of at least 60° C. for the desorption of at least said gaseous carbon dioxide and the unit is openable to flow-through of the gas mixture and for contacting it with the sorbent material for the adsorption step. According to the proposed method, the carbon dioxide capture fraction, defined as the percentage of carbon dioxide captured from the gas mixture in an adsorption step by the sorbent material, is preferably in the range of 10-75%.

The adsorber structure is also designed to sustain large swings in adsorbed water loading both mechanically and chemically during periodic injection of and exposure to steam.

According to the invention, the adsorber structure comprises an array of individual adsorber elements, in the form of sheets or laminates—each adsorber element comprising at least one layer containing a selective porous or permeable solid adsorbent for $CO_2$ capture, wherein the adsorber elements in the array are arranged essentially parallel to each other and spaced apart essentially evenly from each other forming essentially parallel fluid passages for flow-through of gas mixture and/or steam. The open space between sheets is preferably preserved by the insertion of spacer elements attached to the adsorbent sheets. According to the invention, the adsorber structure comprises an array of individual adsorber elements, each adsorber element comprising at least one, preferably porous, support layer and at least one attached or integrated (surficial) sorbent layer. Said sorbent material preferably offers selective adsorption of $CO_2$ over other major non-condensable gases in air in the presence of moisture or water vapor.

Typically, in the adsorber structure individual but essentially identical adsorber elements form a regular aligned stack, the adsorber elements being arranged essentially congruently along the height of the stack, and wherein the distance between neighboring adsorber elements is essentially the same over essentially the whole stack.

The adsorber structure can take the form of a carrier layer, preferably porous carrier layer, and on both sides thereof at least one sorbent layer. The adsorber structure may also be based on a porous carrier layer; a surface layer portion on one or both sides is chemically modified or coated in a way as to provide for the $CO_2$ adsorption property. Further, the adsorber structure may be formed by a porous carrier layer, which also has the property of acting as the sorbent.

The adsorber elements in the array are arranged essentially parallel to each other and spaced apart from each other forming parallel fluid passage for flow-through of gas mixture and/or steam.

Flow-through of gas mixture in this context is generally to be understood as flowing along the parallel fluid passages and parallel to the sorbent layers to allow for adsorption of the carbon dioxide on said sorbent layers. The flow speed, or through-flow velocity, of the ambient atmospheric air through the adsorber structure as defined here is the air flow speed not at the intake opening of the whole sorbent structure but is the air flow speed in these parallel fluid passages in step (d), and the same applies to the flow speed of the steam through the adsorber structure in step (d).

Of course in such an adsorber structure in the form of a stack the outermost adsorber elements may also just have a carrier or porous layer and on the inner side thereof at least one sorbent layer.

The process gas flows primarily in a direction co-planar to the sheet or laminates between an inlet and an outlet for the stack. The solid structure sorbent has typically only two parallel sides opened in order to channel the process gas flow through the structure adsorbent bed and provide means of mechanical assembly into the separation unit. Alternatively, two sets of two parallel sides are open to flow, with one process gas, such as the adsorption gas flow, flowing from one side to the opposing parallel side, and another process gas, such as the steam flow, flowing from another third side to the parallel fourth side.

The method according to the invention comprises at least the following sequential and in this sequence repeating steps (a)-(e):

(a) contacting said gas mixture in the form of ambient atmospheric air with the sorbent material to allow at least said gaseous carbon dioxide to adsorb on the sorbent material by flow-through through said parallel fluid passages under ambient atmospheric pressure conditions and ambient atmospheric temperature conditions in an adsorption step; thus normally capturing 10% to 75% of $CO_2$ passing the adsorber structure, (b) isolating said sorbent with adsorbed carbon dioxide in said unit from said flow-through of ambient atmospheric air while maintaining the temperature in the sorbent;

(c) injecting a stream of saturated or superheated steam by flow-through through said parallel fluid passages (4) and thereby inducing an increase of the temperature of the sorbent to a temperature between 6° and 110° C., optionally also inducing an increase in internal pressure of the reactor unit, and starting the desorption of $CO_2$;

(d) extracting at least the desorbed gaseous carbon dioxide from the unit and separating gaseous carbon dioxide from steam by condensation in or downstream of the unit, while still contacting the sorbent material with steam by injecting and/or (partially) circulating saturated or superheated steam into said unit, thereby flushing and purging both steam and $CO_2$ from the unit, normally at a molar ratio of steam to carbon dioxide between 4:1 and 40:1, while regulating the extraction and/or steam supply to essentially maintain the temperature in the sorbent at the end of the preceding step (c) and/or to essentially maintain the pressure in the sorbent at the end of the preceding step (c);

(e) bringing the sorbent material to ambient atmospheric temperature conditions.

The steam downstream of the unit is either condensed or circulated in step d), or only a portion of the steam downstream of the unit is circulated and the remainder is condensed. Control of the molar steam/CO2 ratio in step (d) can, without particular efforts and based on monitoring of this ratio by corresponding sensors in the unit and/or upstream or downstream of the unit, be adapted by the corresponding inflow and pressure level/temperature level of steam introduced into the unit and the pump and valve operation of the unit. The ratio is also a function of sorbent properties and local steam flow. The given range refers to the conditions at which desorption is considered viable.

The throughflow of gas, explicitly CO2, is regulated so as to produce a partial pressure of steam to achieve the goal temperature and/or pressure in step (c). During step (c) steam can be injected in the form of fresh steam introduced by way of the corresponding inlet, however steam may also be at least partly or fully recirculated from the outlet of steam, if need be, such a recirculation involves reheating of recirculated steam. If such steam recirculation takes place, the recirculated steam at least at the end of the process is not pure steam but carries desorbed carbon dioxide as well. The regulation aims at producing a partial pressure of steam to achieve the goal temperature and/or pressure in step (c) in the variant of the proposed process, where there is at least partial recirculation of steam in step (c), so where a mixture of CO2 and steam are injected in step (c), thus a certain portion of gases defined by the composition of the inlet gases is preferably continuously extracted. Conversely, in the variant where only fresh steam is supplied, no CO2 need be preferably extracted within step (c) until the condition for continuing with step (d) is met. So in the above step (c) there is no or no substantial extraction of desorbed gaseous carbon dioxide from the unit, but only injection of said stream of saturated or superheated steam for the situation where only fresh steam is used, while if not only fresh steam but also recirculated steam or only recirculated steam is used in step (c), there can and preferably is at least partial extraction of carbon dioxide during step (c).

The conditions of the process are controlled such that in this step (c) by virtue of the injection of the stream of saturated or superheated steam the internal pressure of the reactor increases. The increase in pressure is for example due to the expansion of the steam in the reactor, and typically the pressure increase is controlled by adapting the valve and pump operation of the unit and/or the pressure and/or temperature level of the stream of saturated or superheated steam injected into the unit as is known to the skilled person. For a typical process the pressure is increasing from a level as given in step (b) to a value in the range of 200 mbar to 1500 mbar in this step (d).

At least in step (d) the flow speed of the steam through the adsorber structure can be in the range of 1-6 m/s if the flow of the gas mixture in step (a) and the flow of the steam is step (d) are along different flow path flows, further preferably if the flow of steam in step (d) is essentially orthogonal to that of the gas mixture in step (a).

An alternative second or additional characterisation of the process is not by way of the flow speed of the steam and of the gas mixture, but by way of the specific flow rate of the corresponding flow.

The flow rate conditions based on calculations can be summarized as follows:

| | range flow air [m3/h] | | range flow steam [kg/h] | |
|---|---|---|---|---|
| adsorber mass [kg] | 100000 specific flow of air | 650000 [m3/h/kg] | 6000 specific flow of steam | 20000 [kg/h/kg] |
| 75 | 1333 | 8667 | 80 | 267 |
| 3000 | 33 | 217 | 2 | 7 |
| Range: | 33-8667 m3/h/kg | | 2-267 kg/h/kg | |
| adsorber volume [m3] | 100000 specific flow of air | 650000 [m3/h/m3] | 6000 specific flow of steam | 20000 [kg/h/m3] |
| 1.5 | 66667 | 433333 | 4000 | 13333 |
| 20 | 5000 | 32500 | 300 | 1000 |
| Range: | 5000-433333 m3/h/m3 | | 300-13333 kg/h/m3 | |

In step (a) according to a first characterisation the flow speed of the gas mixture through the adsorber structure is in the range of 2-9 m/s or 2-8 m/s, and at least in step (d) the flow speed of the steam through the adsorber structure is at least 0.2 m/s, preferably in the range of 0.3-1.0 m/s if the flow plane is the same as that of the air during adsorption, or 1-6 m/s if the flow is mostly orthogonal to that of the airflow during adsorption. The flow speed is defined as the mean speed of the corresponding medium in the slots (fluid passages) between the individual absorber elements of the adsorber structure.

In the context of this disclosure, the expressions "ambient atmospheric pressure" and "ambient atmospheric temperature" refer to the pressure and temperature conditions to that a plant that is operated outdoors is exposed to, i.e. typically ambient atmospheric pressure stands for pressures in the range of 0.8 to 1.1 barabs and typically ambient atmospheric temperature refers to temperatures in the range of −40 to 60° C., more typically −30 to 45° C. The gas mixture used as input for the process is ambient atmospheric air, i.e. air at ambient atmospheric pressure and at ambient atmospheric temperature, which normally implies a $CO_2$ concentration in the range of 0.03-0.06% by volume. However, also air with lower or higher $CO_2$ concentration can be used as input for the process, e.g. with a concentration of 0.1-0.5% by volume, so generally speaking preferably the input $CO_2$ concentration of the input gas mixture is in the range of 0.01-0.5% by volume.

According to a preferred embodiment, in step (a) the flow speed of the gas mixture through the adsorber structure is in the range of 1-6 m/s.

According to yet another preferred embodiment, at least in step (d) the flow speed of the steam through the adsorber structure is in the range of 0.3-6 m/s.

At least in step (d) the flow speed of the steam through the adsorber structure can be in the range of 0.3-1.0 m/s if the flow of the gas mixture in step (a) and the flow of the steam is step (d) are essentially along the same flow path.

Accordingly, in step (a) the specific flow rate of the gas mixture through the adsorber structure, as a function of the mass of the sorbent, can be adapted to be in the range of 20-10,000 m3/h/kg, preferably in the range of 30-9,000 or 100-7000 m3/h/kg. These values are generally to be understood as the average values of the specific flow rate of the gas mixture over the time span of step (a).

In step (a) the specific flow rate of the gas mixture through the adsorber structure, as a function of the volume of the sorbent, can be adapted to be in the range of 4,000-500,000 m3/h/m3, preferably in the range of 5,000-450,000 or 10,000-300,000 m3/h/m3.

At least in step (d) the specific flow rate of the steam through the adsorber structure, as a function of the mass of the sorbent, can be adapted to be in the range of 1-500 kg/h/kg, preferably in the range of 2-300 or 50-250 kg/h/kg. Also, these values are generally to be understood as the average values of the specific flow rate of the steam mixture over the time span of the respective step.

At least in step (d) the specific flow rate of the steam through the adsorber structure, as a function of the volume of the sorbent, can be adapted to be in the range of 200-15,000 kg/h/m3, preferably in the range of 300-14,000 or 500-10,000 kg/h/m3.

For DAC capture processes in particular, the carbon dioxide capture fraction, defined as the percentage of carbon dioxide captured from the gas mixture in an adsorption step by the sorbent material can be in the range of 10-75%, preferably in the range of 30-60%. Alternatively, or additionally the amount of carbon dioxide captured on the sorbent per gram sorbent can be at least 0.1 or in the range of 0.1-1.8 mmol/g for an adsorption time span of at least 5 or at least 10 minutes. Alternatively characterised the normalized amount of carbon dioxide captured on the sorbent per gram sorbent per hour can be in the range of 0.5-10 mmol/g/h, preferably in the range of 1-6 mmol/g/h.

The carrier layer optionally may include at least one of metal, polymer, carbon, carbon molecular sieve and graphene material. The first sorbent layer may comprise a first sorbent material, and the second sorbent layer may comprise a second sorbent material, where the first and second sorbent material may have a different material or chemical compositions and/or physical characteristics.

In a preferred embodiment, the adsorber structure comprises an array of individual adsorber elements, each element comprising at least one layer containing a selective porous/permeable solid adsorbent for $CO_2$ capture, wherein the adsorber elements in the array are arranged essentially parallel to each other and spaced apart essentially evenly from each other forming essentially parallel fluid passages for flow-through of gas mixture and/or steam. The open space between sheets can be preserved by the insertion of spacer elements attached to the adsorbent elements.

The concept may, in an alternate embodiment, include an adsorber element with a first sorbent layer and a second sorbent layer, where the first sorbent layer and the second sorbent layer are juxtaposed.

In a further preferred embodiment, the above adsorber elements are arranged to a parallel passage contactor, comprising a plurality of adsorber elements as described previously.

The plurality of elements forms parallel fluid passages, where each passage is bounded at least in portion by the first sorbent layer of one adsorber element, and at least in portion by the second sorbent layer of the neighboring adsorber element.

Preferably, the spacing between the adsorber elements (height of the fluid passages between the adsorber elements) is in the range of 0.2-5 mm, further preferably in the range of 0.4-3 mm.

Further preferably, each adsorber element has the form of a plane with a thickness (perpendicular to the plane) in the range of 0.1-1 mm, preferably in the range of 0.2-0.5 mm.

The above embodiment of the adsorber structure is embedded in a gas separation process to remove at least one first component from a multi-component gas stream, more specifically, in an adsorption/desorption process for the removal and capture at high purity of $CO_2$ from ambient air, and likely also a second component, namely gaseous water. The proposed method at least comprises the following sequential and in this sequence repeating steps, occurring with the adsorber structure within a reactor unit:

(a) ADSORPTION: Contacting said multi-component gas mixture with the multitude of sorbent layers at the bounds of the parallel fluid structures formed by the plurality of adsorber elements, by forcing the multi-component fluid from an inlet side of the adsorber structure to an outlet side of the adsorber structure—to allow at least said first component, preferably gaseous carbon dioxide, but potentially also a second component, likely gaseous water, to adsorb on the sorbent material of the sorbent layers bounding the parallel passages under ambient atmospheric pressure conditions and ambient atmospheric temperature conditions in an adsorption step.

This step is the flow-through adsorption step, typically carried out in a unit having two doors at opposite ends of the unit, which for this process step are both open, such that a fan or ventilation device may induce the flow of the multi-component gas stream through the parallel passages, where the pressure drop across the adsorber structure is normally between 200 Pa and 1200 Pa, more preferably between 200 Pa and 750 Pa or 200 Pa and 600 Pa at average fluid velocities within the parallel fluid passages of between 2 m/s and 9 m/s, more preferably between 4 m/s and 6 or 7 m/s, for a duration of 5 min to 40 min, preferably 10 min to 20 min. In the embodiments, this step is termed step (1). (b) ISOLATION: Isolating said adsorber structure with adsorbed components, preferably carbon dioxide, in said unit from said flow-through while maintaining the temperature in the sorbent and then optionally evacuating said unit to a pressure in the range of 20-200 mbar(abs), or 700-1000 mbar(abs). If carried out in a unit as described in the preceding paragraph, this means that in a first sub-step (in the embodiments termed step (2)) the two doors are first closed and then in a second (optional) sub-step a vacuum is applied (in the embodiments termed step (3)) within this step (b). In the embodiment indicated by FIG. 11, no vacuum was applied—so no evacuation can be applied and the adsorber structure can remain at essentially the ambient atmospheric pressure of step (a) or within ±100 mbar of it.

(c) HEAT: Injecting a stream of saturated or superheated steam and thereby inducing an increase in internal pressure of the reactor unit (only for the case in which before a vacuum was applied in step (b)) and in any case an increase of the temperature of the adsorber structure from normally ambient atmospheric temperature to a temperature between 6° and 110° C., starting the desorption of $CO_2$. The injected flow of steam should suffice to bring the adsorber structure to the desired temperature within 0.5 min to 15 min, preferably between 0.5 min and 10 min. In the embodiments, this step is termed step (5).

What is important about this step (c) is that the heating of the adsorber structure is taking place exclusively by way of contact with this stream of saturated or superheated steam, there is no additional heat input such as for example by way of internal or external heat exchange elements or the like. The contact of the steam with the adsorber structure therefore at the same time leads to heating as well as starting of the desorption process. During this step (c) steam can be injected in the form of fresh steam introduced by way of the corresponding inlet, however steam may also be recirculated from the outlet of steam, if need be, such a recirculation involving reheating of recirculated steam. If such steam recirculation takes place, the recirculated steam at least at the end of the process is not pure steam but carries desorbed carbon dioxide as well.

(d) EXTRACTION: Extracting at least the desorbed gaseous carbon dioxide from the unit and separating gaseous carbon dioxide from steam by condensation in or downstream of the unit. The injected flow of steam should suffice to extract economically feasible amounts of $CO_2$ within 0.5 min to 15 min, preferably between 0.5 min and 10 min. In the embodiments, this step is termed step (6).

During this step (d) preferably still saturated or superheated steam is injected into said unit or circulated through the unit as described above, thereby flushing and purging both steam and $CO_2$ from the unit.

Step (d) normally occurs at a molar ratio of steam to carbon dioxide between 4:1 and 40:1 (preferably calculated as the cumulative value over the full step, so taking the total steam and the total $CO_2$ during the step), and is controlled so by regulating the extraction and/or steam supply to essentially maintain the temperature in the sorbent at the end of the preceding step (c).

Typically, in this step (d) the temperature in the unit is maintained at a level which is in a window of ±20° C. from the temperature of the sorbent at the end of the preceding step (c), preferably in a window of ±10° C. or ±5° C.

Alternatively or additionally, the process in step (d) can be controlled in that the pressure in the unit at the end of the preceding step (c) is essentially maintained, which means that the pressure in the unit is maintained at a level which is in the window of ±0.2 bar, preferably in a window of ±0.1 bar from the pressure in the unit at the end of the preceding step (c). (e) Bringing the adsorber structure to ambient atmospheric pressure conditions and ambient atmospheric temperature conditions, preferably by opening the doors of the adsorber structure in a first sub-step (in the embodiments termed step (8)) and by flushing with said gas mixture in the form of ambient air in a second sub-step (in the embodiments termed step (9)).

According to a preferred embodiment, after step (d) and before step (e) the following step is carried out:

(d1) ceasing the injection and, if used, circulation of steam, and evacuation of the unit to pressure values between 20-500 mbar(abs), preferably in the range of 50-250 mbar (abs) in the unit, thereby causing evaporation of water from the sorbent and both drying and cooling the sorbent. In the embodiments, this step is termed step (7).

This step (d1) is a preferred step, since it unexpectedly allows combining two effects in one single step: after the steam treatment the sorbent needs to be cooled down to ambient conditions again, but, more importantly, it also needs to be dried. This step allows the combination of these two features in one single processing step, which makes the process quicker and more economical. Drying sufficiently has been shown to be important to the successful operation of such processes relying on fast kinetics resulting from short diffusion lengths.

After step (b) and before step (c) the following step can be carried out: (b1) flushing the unit of non-condensable gases by a stream of non-condensable steam while essentially holding the pressure of step (b), preferably holding the pressure of step (b) in a window of ±50 mbar, preferably in a window of ±20 mbar and/or holding the temperature below 75° C. or 70° C. or below 60° C., preferably below 50° C. In a further embodiment of the step b1, the temperature of the adsorber structure rises from the conditions of step (a) to 80-110° C. preferably in the range of 95-105° C.

In the embodiments, this step is termed step (4).

In step (b1) the unit can preferably be flushed with saturated steam or steam overheated by at most 20° C. in a ratio of 0.3-13.3 kg/h per L or 1 kg/h to 10 kg/h of steam per liter volume of the adsorber structure, while remaining at the pressure of step (b1), to purge the reactor of remaining ambient air. The purpose of removing this portion of ambient air is to improve the purity of the captured $CO_2$.

In step (c), steam can be injected in the form of steam introduced by way of a corresponding inlet of said unit, and steam can be recirculated from an outlet of said unit to said inlet, preferably involving reheating of recirculated steam, or by the re-use of steam from a different reactor.

In step (c) furthermore preferably the sorbent can be heated to a temperature in the range of 80-110° C. or 80-100° C., preferably to a temperature in the range of 85-98° C.

According to yet another preferred embodiment, in step (c) the pressure in the unit is in the range of 700-950 mbar(abs), preferably in the range of 750-900 mbar(abs).

According to yet another preferred embodiment, in step (c) the pressure of the unit varies less than +/100 mbar more preferably less than +/−50 mbar from the pressure of step (b).

A particularly efficient release and take out of carbon dioxide is surprisingly possible if the steam is passing the adsorber structure and the sorbent layers contained therein at a particularly elevated speed (typically while keeping the volume flow the same as in conventional processes). This high-speed steam purge can be implemented very efficiently in that the steam in step (c) and/or (d) takes a different path to the flow of air within the parallel passages during adsorption in step (a) in order to increase local steam velocity in the parallel passages of the adsorber structure during desorption. Preferably and very efficiently, the overall flow paths of adsorption during step (a) and during steam injection in step (c) and/or (d) can be chosen to be essentially orthogonal. In line with this, according to another preferred embodiment in step (c) and/or in step (d) the flow velocity of the steam in the adsorber structure is above 0.1 m/s, preferably in the range of 0.3-1 m/s for flow in the adsorption flow direction, and, more preferably in the range of 1-6 m/s in the flow direction orthogonal to the adsorption flow direction.

As pointed out above, flow-through of gas mixture here is generally to be understood as flowing along the parallel fluid passages and parallel to the sorbent layers to allow for adsorption of the carbon dioxide on said sorbent layers. Typically, the sorbent structure provides for a stack of flow-through slots, the boundary surfaces of which are provided by the sorbent material layers. During adsorption in step (a) the ambient airflows through these slots in a first direction. During step (c) and/or (d) the flow direction can be the same as during step (a), but it can preferably be given as a flow in an opposite direction through the flow-through slots, or it can be provided as a flow in a direction at a right angle to the flow-through direction during adsorption in step (a). For the situation where in step (a) the flow-through slots between the sorbent layers are bordered laterally by side walls, while the intake side and the outlet side of the flow-through slot is open during adsorption in step (a), the latter can be implemented by providing openings at opposite side walls for entry and respective exit of steam while closing the intake side and the outlet side open during adsorption in step (a). So the different path for adsorption and steam injection can be implemented in practice by having a unit with a housing structure which has a short flow through length along a first direction, which is the adsorption flow through direction, and which has a long flow through length along a second, preferably orthogonal direction, which is the desorption flow through direction for the steam. This in particular to make sure that the steam contacts as much as possible of the sorbent while passing through the unit. For this, the unit may have a large opening at two opposing ends of the adsorption flow through direction, which are open during adsorption, and which are closed during desorption, and smaller openings in opposing circumferential side walls of the unit for the desorption, which are closed during adsorption and which are open during desorption for passing the steam through for desorption in a direction orthogonal to the one during adsorption.

As pointed out above, said unit is preferably able to sustain a vacuum pressure of 400 mbar(abs) or less, and step (b) preferably includes isolating said sorbent with adsorbed carbon dioxide in said unit from said flow-through while maintaining the temperature in the sorbent and then evacuating said unit to a pressure in the range of 20-400 mbar (abs), and wherein step (e) includes bringing the sorbent material to ambient atmospheric pressure conditions and ambient atmospheric temperature conditions, and wherein preferably after step (d) and before step (e) the following step is carried out.

According to yet another preferred embodiment, step (d1) involves ceasing the injection and, if used, circulation of steam, and evacuation of the unit to pressure values between 20-500 mbar(abs), preferably in the range of 50-250 mbar (abs) in the unit, thereby causing evaporation of water from the sorbent and both drying and cooling the sorbent.

Step (c) can be carried out exclusively by contacting said gas mixture with the sorbent material under ambient atmospheric pressure conditions and ambient atmospheric temperature conditions to evaporate and carry away water in the unit and to bring the sorbent material to ambient atmospheric temperature conditions.

Preferably, said gas mixture in step (a) flows through said parallel fluid passages essentially along a first direction, and wherein said steam in at least one or both of steps (c) and (d) flows essentially along that same first direction or a direction essentially opposite to said first direction.

Alternatively, said gas mixture in step (a) flows through said parallel fluid passages essentially along a first direction, and wherein said steam at least one or both of steps (c) and (d) flows essentially along a direction orthogonal to said first direction through said parallel fluid passages.

Furthermore, the present invention relates to a device for carrying out a method for separating gaseous carbon dioxide from a gas mixture in the form of ambient air, containing said gaseous carbon dioxide as well as further gases different from gaseous carbon dioxide by cyclic adsorption/desorption using a sorbent material adsorbing said gaseous carbon dioxide as detailed above.

Said device comprises: a steam source; at least one unit containing an adsorber structure with said sorbent material, the adsorber structure being heatable to a temperature of at least 60° C. for the desorption of at least said gaseous carbon dioxide and the unit being openable to flow-through of the gas mixture and for contacting it with the sorbent material for an adsorption step, wherein the adsorber structure is given as described above, i.e. comprises preferably an array of individual adsorber elements, each adsorber element comprising a porous support layer and attached or integrated at least one sorbent layer comprising or consisting of at least on sorbent material, or a central carrier layer and on both sides thereof at least one sorbent layer comprising or consisting of at least on sorbent material, wherein the adsorber elements in the array are arranged essentially parallel to each other and spaced apart from each other forming parallel fluid passages for flow-through of gas mixture and/or steam; at least one device, preferably a condenser, for separating carbon dioxide from water. More specifically the present invention also and also independently of the above method relates to a device for the adsorption and desorption of the sorbent used in cyclically adsorption-desorption for the capture of carbon dioxide, CO₂, directly from ambient atmospheric air, as well as to uses of such a method and devices for such a method. While much of the experience in DAC processes stems from flue gas capture, the underlying difference is the source of $CO_2$, which essentially determines the considerable divergence of solutions for both tasks. The lower concentration of $CO_2$ in ambient atmospheric air compared to flue gas means a large volume of air has to be moved to capture significant amounts of $CO_2$. Therefore, a low-pressure drop adsorber structure is required if the energy requirements for the movement of said air is to not be prohibitively high. At the same time, there is no requirement as in flue gas capture to assure almost complete capture of $CO_2$ by the system at capture fractions of 80% or higher. Capture fractions well below 70% are feasible for air capture, providing another incentive to favor structures with low pressure-drop and quick loading.

The pressure drop across such an adsorber structure can be estimated by the following equation:

$$\frac{\Delta P}{L} = K_{surface} \cdot (U_{unlet}) \cdot (b_{spacer})^{-2}$$

wherein:

$\Delta P$ is the pressure drop across the structure in Pascal [Pa]

L is the length of the parallel passage the gas flows across in adsorption (element length) in centimeters [cm]

$K_{surface}$ is a roughness factor to be determined experimentally, typically in the range of 1 to 10

$U_{inlet}$ is the velocity on the inlet plane of the adsorber structure (not yet the velocity in the parallel passage) in meters per second [m/s]

$b_{spacer}$ is the height of the spacers determining the width of the parallel fluid passages (spacing width) in millimeters [mm].

Based on calculations further detailed below, a functional relationship can be established, allowing the dimensioning of adsorber structures comprising an array of individual adsorber elements, in the form of sheets or laminates—each adsorber element comprising at least one layer containing a selective porous or permeable solid adsorbent for $CO_2$ capture, wherein the adsorber elements in the array are arranged essentially parallel to each other and are spaced apart essentially evenly from each other forming essentially parallel fluid passages for flow-through of gas mixture and/or steam.

Correspondingly, the present invention proposes a device for separating gaseous carbon dioxide from a gas mixture in the form of ambient atmospheric air, containing said gaseous carbon dioxide as well as further gases different from gaseous carbon dioxide by cyclic adsorption/desorption using a sorbent material adsorbing said gaseous carbon dioxide.

Preferably this device can be used in a process as described above.

The device comprises: a steam source; at least one unit containing an adsorber structure with said sorbent material, the adsorber structure being suitable and adapted to sustain a temperature of at least 60° C. for the desorption of at least said gaseous carbon dioxide and the unit being openable to flow-through of the gas mixture and for contacting it with the sorbent material for an adsorption step.

The adsorber structure comprises an array of individual adsorber elements in the form of layers, each adsorber element comprising at least one sorbent layer, wherein the adsorber elements in the array are arranged essentially parallel to each other and essentially equally spaced apart from each other forming parallel fluid passages for flow-through of ambient atmospheric air and/or steam, and wherein the individual adsorber elements have an element length L along the flow-through direction of the ambient atmospheric air in an adsorption step (a), wherein the individual adsorber elements have an element thickness $b_{element}$ along a direction orthogonal to said flow-through direction, and wherein the spacing between the adsorber elements has a spacing width $b_{spacer}$;

at least one device for separating carbon dioxide from water.

According to a first characterizing aspect of the invention, the spacing width $b_{spacer}$ (height of the fluid passages between the adsorber elements) is in the range of 0.4-5 mm, and wherein the element length L is in the range of 100-3000 mm.

The open space between sheets is preferably preserved by the insertion of spacer elements attached to the adsorbent sheets.

Typically, in the adsorber structure individual but essentially identical adsorber elements form a regular aligned stack, the adsorber elements being arranged essentially congruently along the height of the stack, and wherein the distance between neighboring adsorber elements is essentially the same over essentially the whole stack.

According to the invention, the adsorber structure comprises an array of individual adsorber elements. Each adsorber element is a composite of a porous support layer or sheet and at least one sorbent layer attached to said porous support such that it is accessible from both sides of the adsorber element. The sorbent layer comprises or consists of at least one sorbent material, offering selective adsorption of $CO_2$ over other major non-condensable gases in air in the presence of moisture. In an alternate embodiment, the adsorber element comprises a carrier or support layer, with a first and second sorbent layer attached on either side of said carrier, each sorbent layer consisting of at least one sorbent material, offering selective adsorption of $CO_2$ over other major non-condensable gases in air in the presence of moisture or water vapor. The sheet or laminate design is optimized towards maximizing the fraction of active adsorbent (greater than 60%) in order to reduce the overall volume of the contactor at fixed $CO_2$ capture capacity.

The individual adsorber elements take the form of sheets or laminates—each adsorber element comprising at least one layer containing a selective porous or permeable solid adsorbent for $CO_2$ capture, wherein the adsorber elements in the array are arranged essentially parallel to each other and spaced apart essentially evenly from each other forming essentially parallel fluid passages for flow-through of gas mixture and/or steam. The open space between sheets is preferably preserved by the insertion of spacer elements attached to the adsorbent sheets. According to the invention, preferably the adsorber structure comprises an array of individual adsorber elements, each adsorber element comprising at least one preferably porous support layer and at least one attached or integrated (surficial) sorbent layer. Said sorbent material preferably offers selective adsorption of $CO_2$ over other major non-condensable gases in air in the presence of moisture or water vapor, The adsorber structure can take the form of a carrier layer, preferably a porous carrier layer, and on both sides thereof at least one sorbent layer. The adsorber structure may also be based on a porous carrier layer, a surface layer portion on one or both sides is chemically modified or coated in a way as to provide for the $CO_2$ adsorption property. Further the adsorber structure may be formed by a porous carrier layer, which also has the property of acting as the sorbent.

The adsorber elements in the array are arranged essentially parallel to each other and spaced apart from each other forming parallel fluid passage for flow-through of gas mixture and/or steam. Of course, in such an adsorber structure in the form of a stack, the outermost adsorber elements may also just have a carrier layer and on the inner side at least one sorbent layer.

The spacing width is preferably in the range of 0.4-5 mm, preferably in the range of 0.4-3 mm or 0.5-3 mm.

The element length (L) is preferably in the range of 100-3000 mm, further preferably in the range of 200-2000 mm.

In a simplified representation, the above equation can be reformulated to express the length L as a function of the other parameters, namely as follows:

$$L = \frac{\Delta P \cdot b_{spacer}^2}{K_{linear} \cdot U_{inlet} \cdot \left(1 + \frac{b_{element}}{b_{spacer}}\right)}$$

wherein the values are typically given in the following ranges (values to be inserted into the above formula using the units given in the examples below):

$\Delta P$: 150-350 Pa (typically for axial fans), 500-700 Pa or 500-750 Pa (typically for radial fans), 1000-1200 Pa (typically for higher power radial fans);

$U_{inlet}$ is typically in the range of 2-6 m/s;

$b_{element}$, element thickness of the adsorber element: 0.1-0.5 mm;

$b_{spacer}$: 0.4-5 mm, preferably 0.4-3 mm;

$K_{linear}$: linear roughness factor, typically in the range of 1.0-10.

$$U_{inlet} \cdot \left(1 + \frac{b_{element}}{b_{spacer}}\right)$$

is essentially the velocity within the parallel passages.

This can further be simplified using a global parameter $K_{global}$.

So the element length (L in [mm]) is preferably given as a function of the spacing width ($b_{spacer}$ in [mm]), and of the element thickness ($b_{element}$ in [mm], being defined as the thickness of the adsorber elements measured in a direction perpendicular to the plane of the parallel fluid passages), by the equation:

$$L = \frac{K_{global} \cdot b_{spacer}^2}{\left(1 + \frac{b_{element}}{b_{spacer}}\right)}$$

wherein $K_{global}$ is in the range of 70-2500 mm^-1, preferably in the range of 200-1000 mm^-1.

This applies to the boundaries for L and $b_{element}$ as given above and as detailed in claim 1, i.e. the values for L calculated according to this formula have to be in the range of 100-3000 mm, or in one of the above-mentioned preferred ranges, but can also, according to a second independent characterization of the invention, independently of these boundaries be used for characterising the dimensioning of the adsorber structure.

The above formula allows specification of a range in length according to technically feasible operating conditions with a pressure drop that can technically be achieved by a fan or ventilator. This range in length is then technically viable for CO2 capture from ambient air. Preferably, in particular in a device with axial fans for propelling the airflow through the adsorber structure, $K_{global}$ is in the range of 70-1000 mm^-1, preferably in the range of 400-800 mm^-1. In a device with radial fans for propelling the airflow through the adsorber structure, $K_{global}$ al is preferably in the range of 200-2000 mm^-1, preferably in the range of 800-1500 mm^-1.

In a device with higher power fans (such as multistage axial or radial fans) for propelling the airflow through the adsorber structure, $K_{global}$ is typically in the range of 500-2500 mm^-1, preferably in the range of 1000-2000 mm^-1. In the above equation, preferably $b_{element}$ is in the range of 0.1-1 mm, preferably in the range of 0.1-0.5 mm and/or $b_{spacer}$ is in the range of 0.4-5 mm, preferably 0.5-3 mm.

Typically, the adsorber elements comprise a central and preferably porous support layer and composited on both sides thereof at least one sorbent layer.

The adsorber structure preferably comprises an array of individual adsorber elements, each adsorber element a composite of a preferably porous support layer and at least one porous and/or permeable sorbent layer with chemically attached carbon dioxide capture moieties, preferably in the form of amine groups, wherein the porous sorbent layer is preferably in the form of a woven or non-woven, fibre-based structure.

Preferably said carrier support layer is based on at least one of metal, polymer, carbon, carbon molecular sieve and graphene material.

The adsorber elements in the array can be arranged essentially parallel to each other and spaced apart by spacer elements from each other forming parallel fluid passages for flow-through of ambient atmospheric air and/or steam.

Preferably, the spacing between the layers is in the range of 0.2-5 mm, further preferably in the range of 0.4-3 mm, and wherein further preferably each adsorber element has the form of a plane with a thickness in the range of 0.1-1 mm, preferably in the range of 0.2-0.5 mm, The device for separating carbon dioxide from water can be a condenser.

At the gas outlet side of said device for separating carbon dioxide from water, preferably said condenser, there can be at least one of, preferably both of a carbon dioxide concentration sensor and a gas flow sensor for controlling the desorption process.

Preferably, the device is suitable and adapted such that in the adsorption step (a) the flow speed of the ambient atmospheric air through the adsorber structure is in the range of 2-9 m/s as described further above. In terms of constructional features this is achieved in that the spacing width (height of the fluid passages between the adsorber elements) and the element length are in the range as specified further above and in that propelling means for the ambient atmospheric air are provided allowing for that flow speed in the adsorber structure.

The flow speed is defined as the mean speed of the corresponding medium in the slots (fluid passages) between the individual absorber elements of the adsorber structure. Alternatively or additionally, it is suitable and adapted such that in a steam flow through step (d) the flow speed of the steam through the adsorber structure is in the range of at least 0.2 m/s. Again, in terms of constructional features this is achieved in that the spacing width (height of the fluid passages between the adsorber elements) and the element length are in the range as specified further above and in that propelling means for the same are provided allowing for that flow speed in the adsorber structure.

Further preferably, the device is suitable and adapted such that in the adsorption step (a) the flow speed of the ambient atmospheric air through the adsorber structure is in the range of 4-6 m/s, or it is suitable and adapted such that in a steam flow through step (d) the flow speed of the steam through the adsorber structure is in the range of 0.3-6 m/s.

According to yet another preferred embodiment, the device comprises means for directing the steam in a steam flow through step (d) along a different flow direction than the flow direction of the flow-through of the ambient atmospheric air in the adsorption step (a), preferably along a flow direction orthogonal to the flow-through direction of the ambient atmospheric air in the adsorption step (a).

Preferably at least in a steam flow through step (d) the flow speed of the steam through the adsorber structure is in the range of 1-6 m/s if the flow of the ambient atmospheric air in step (a) and the flow of the steam in step (d) are along different flow path flows, further preferably if the flow of steam in step (d) is essentially orthogonal to that of the ambient atmospheric air in step (a).

Furthermore, the present invention relates to the use of a device as described above for direct air capture.

The adsorber structure as used in this method comprises a multitude of adsorber elements arranged in an array, each of them comprising of at least one sorbent layer, offering selective adsorption of $CO_2$ over other major non-condensable gases in air in the presence of moisture or water vapor. The sheet or laminate design is optimized towards maximizing the fraction of active adsorbent (greater than 60% or than 75%) in order to reduce the overall volume of the contactor at fixed $CO_2$ capture capacity.

Additionally and preferably, the structure adsorbent contains spacer elements to maintain open parallel passages throughout the structure while minimizing flow resistance through the contactor.

The adsorber structure is also designed to sustain large swings in adsorbed water loading both mechanically and chemically during periodic injection of and exposure to steam. According to the invention, the adsorber structure comprises an array of individual adsorber elements, in the form of sheets or laminates—each adsorber element comprising at least one layer containing a selective porous or permeable solid adsorbent for $CO_2$ capture, wherein the adsorber elements in the array are arranged essentially parallel to each other and spaced apart essentially evenly from each other forming essentially parallel fluid passages for flow-through of gas mixture and/or steam. The open space between sheets is preferably preserved by the insertion of spacer elements attached to the adsorbent sheets. According to the invention, the adsorber structure comprises an array of individual adsorber elements, each adsorber element comprising or is a composite of a preferably porous support layer and on one or both sides thereof at least one sorbent layer, wherein the adsorber elements in the array are arranged essentially parallel to each other and spaced apart from each other forming parallel fluid passage for flow-through of gas mixture and/or steam, Of course in such an adsorber structure in the form of a stack the outermost adsorber elements may also just have a carrier layer and on the inner side at least one sorbent layer. The process gas flows primarily in a direction co-planar to the sheet or laminates between an inlet and an outlet for the stack. The solid structure sorbent has typically only two parallel sides opened in order to channel the process gas flow through the structure adsorbent bed and provide means of mechanical assembly into the separation unit. Alternatively, two sets of two parallel sides are open to flow, with one process gas, such as the adsorption gas flow, flowing from one side to the opposing parallel side, and another process gas, such as the steam flow, flowing from another third side to the parallel fourth side.

As pointed out above, said unit is preferably able to sustain a vacuum pressure of 400 mbar(abs) or less, and step (b) preferably includes isolating said sorbent with adsorbed carbon dioxide in said unit from said flow-through while maintaining the temperature in the sorbent and then evacuating said unit to a pressure in the range of 20-400 mbar (abs), and wherein step (e) includes bringing the sorbent material to ambient atmospheric pressure conditions and ambient atmospheric temperature conditions.

Preferably, the above-mentioned method or device is used for direct air capture or for recovery of carbon dioxide from ambient atmospheric air.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1 shows a schematic representation of required and optional steps for the method presented to attain $CO_2$ in an economically feasible cyclic adsorption and desorption process;

DESCRIPTION OF PREFERRED EMBODIMENTS

The embodiments of the present invention presented below describe the proposed method in terms of a variable set of process steps, which an adsorber structure is exposed to in a dedicated reaction unit and can be run through in various sequences. The process steps of the method for the preferred embodiments include:

1. $CO_2$ capture by adsorption of $CO_2$ onto the adsorber structure by contacting the sorbent layers with sufficient amounts of ambient atmospheric air, with a capture fraction between 10% and 75% (adsorption step (a), mandatory).

2. Isolating the adsorber structure in the reactor from external ambient atmospheric air (isolation step (b), mandatory).

3. Establishing a pressure typically between 50-400 mbar (abs) in the reactor unit by means of evacuation (evacuation step within (b), optional).

4. Flushing the reactor unit of non-condensable gases by an initial flow of non-condensable steam while holding the pressure of step 3 or not allowing the adsorber structure temperature to exceed 75° C. (flushing with steam step (b1), optional).

5. Injecting a stream of saturated or superheated steam at a temperature of typically at least 45° C. and, if evacuation in step 3 took place, inducing an increase in internal pressure of the reactor unit, and an increase of the temperature of the adsorber structure to a temperature between 6° and 110° C., preferably according to the saturation temperature for the current reactor pressure, facilitating the desorption and release of $CO_2$ (heat up with steam step (c), mandatory).

6. Opening of the reactor unit outlet while still injecting steam, thus flushing and purging both steam and $CO_2$ from the adsorber structure and reactor unit, typically at a molar ratio of steam to $CO_2$ between 4:1 and 40:1, while preferably regulating the outflow in such a way to maintain to a degree the pressure achieved at the end of the previous step (purge step with steam (d), mandatory).

7. After ceasing the injection of steam, reduction of unit pressure to values between 50-250 mbar(abs) in the reactor unit by means of evacuation, which causes evaporation of water from the adsorber structure subsequently both drying and cooling the sorbent material (vacuum cool/dry step (d1), optional).

8. Breaking the isolation of the reactor to the ambient atmospheric air and re-pressurizing the reactor unit if required (step of breaking isolation and re-pressurisation (e), mandatory).

9. Drying of the adsorber structure with warm air between 40° C. and 100° C. (step of air drying (e1), optional). Continue cyclic operation with step 1.

A schematic illustration of this sequence of steps is given in FIG. 1.

Figure 2:
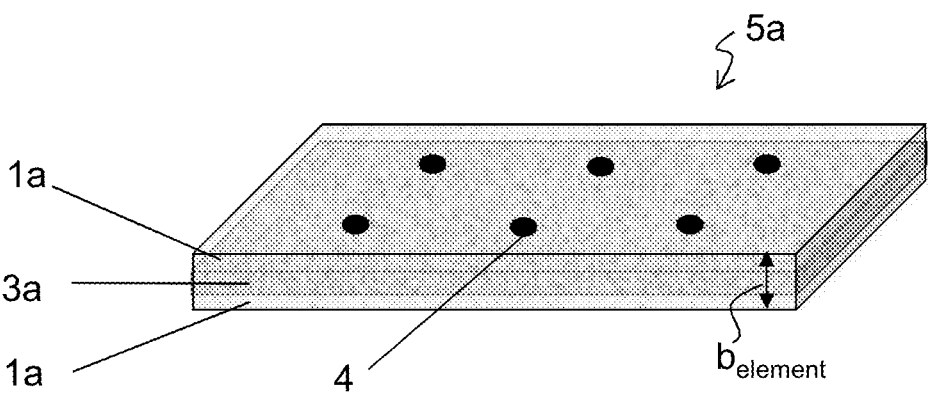
FIG. 2 shows a schematic of a single adsorber element, as comprising a porous support and at least one sorbent layer.

One embodiment of the composition of the individual adsorber elements is shown in FIG. 2. The individual adsorber element 5*a* comprises at least one sorbent layer 1*a* on a porous support layer 3*a*, where said sorbent layer comprises at least one sorbent material containing a selective porous solid adsorbent for $CO_2$ capture, thus forming a sheet or laminate. The spacing and arrangement of multiple elements is achieved by the insertion of spacer elements 4 on one or both planar sides of the element.

Figure 3:
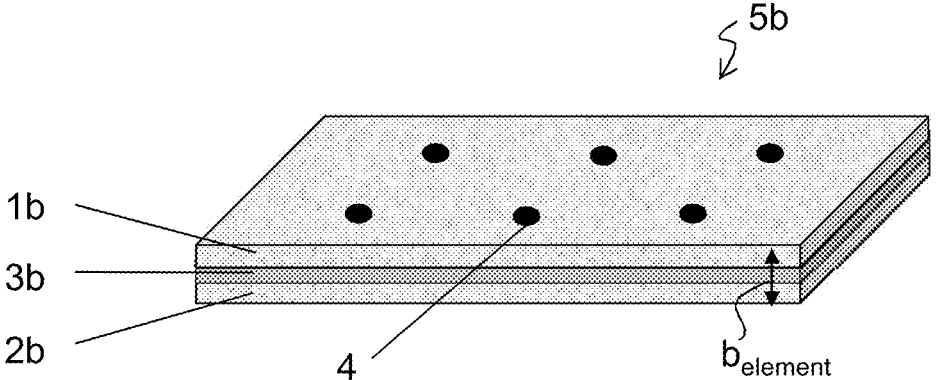
FIG. 3 shows a schematic of a single adsorber element, as comprising a carrier layer and at least one sorbent layer on either side.

Another embodiment of the composition of the individual adsorber elements is shown in FIG. 3. The individual adsorber element 5*b* comprises a layer structure with a central carrier layer 3*b*, adjacent to which on both sides there is provided a first sorbent layer 1*b* and a second sorbent layer 2*b*, respectively. Each individual adsorber element has a thickness $b_{element}$, and a length L along the flow direction in adsorption. More specifically, in the embodiments used here, the individual adsorber element 5*b* comprises a sheet or laminate—comprising at least one layer containing a selective porous solid adsorbent for $CO_2$ capture and, if need be, a central porous support layer. The spacing and arrangement of multiple elements is achieved by the insertion of spacer elements 4 on one or both planar sides of the element.

Figure 4:
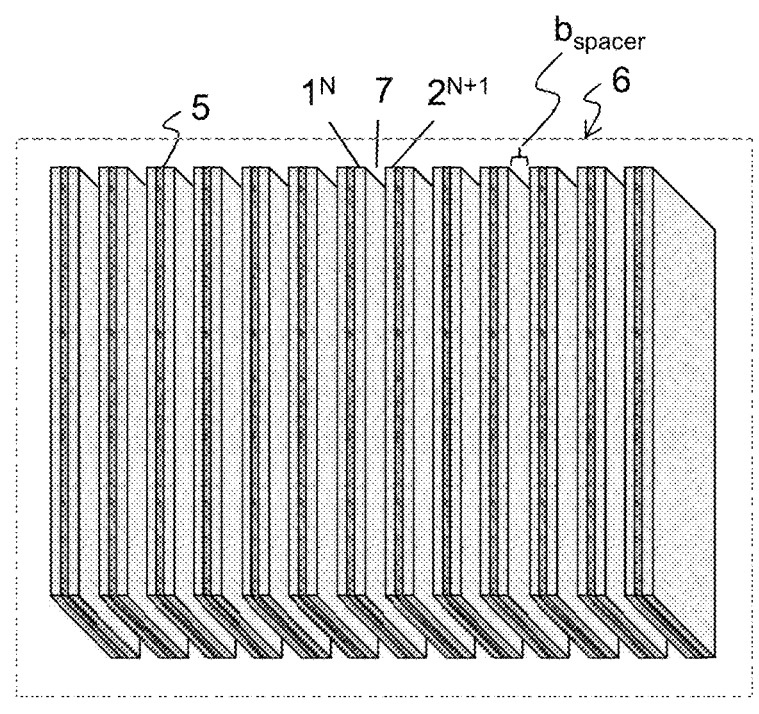
FIG. 4 shows an exemplary schematic of an adsorber structure comprising a plurality of parallel adsorber elements thus forming a plurality of parallel fluid passages.

FIG. 4 shows, how individual adsorber elements 5 are combined to form an adsorber structure 6, by arranging them as an array of parallel layers, between which there are fluid passages 7 for the passage of the air in the adsorption step, and for the steam in the desorption step, each passage bound by the sorbent layer of one adsorber element $1^N$ and another sorbent layer of the next adsorber element $2^{N+1}$ The width of these flow passages is $b_{spacer}$.

Figure 5:
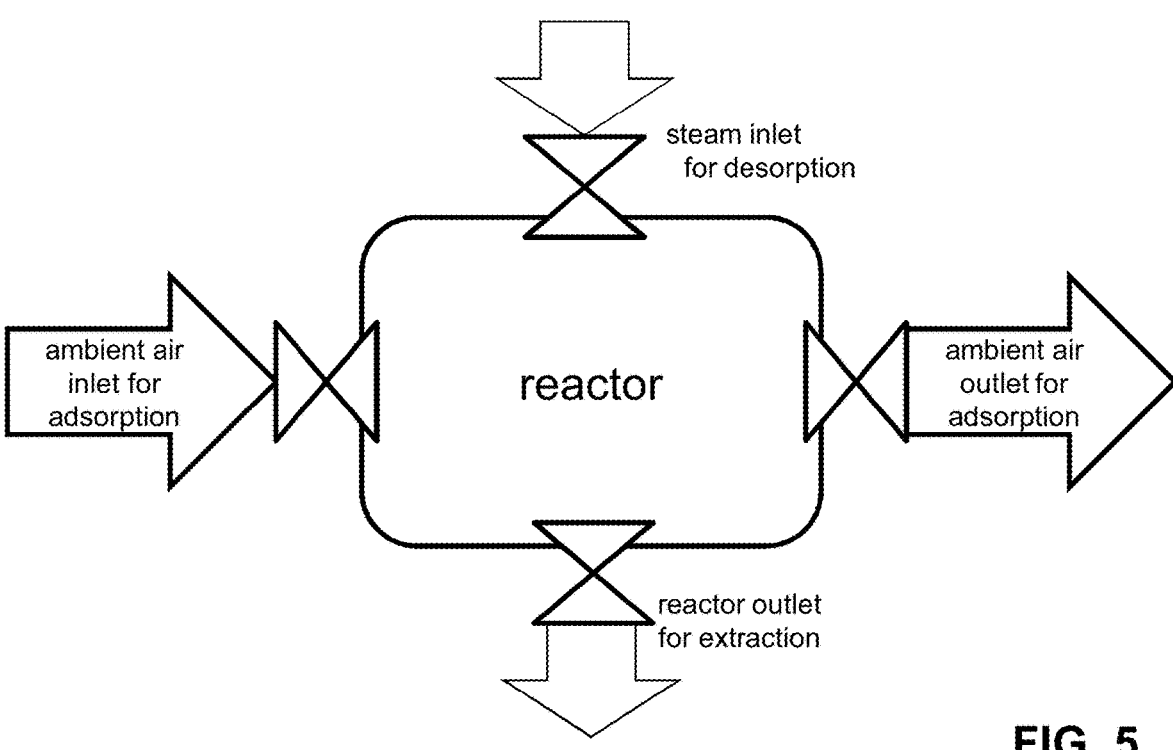
FIG. 5 shows a schematic realization of a reactor unit with the required inlets and outlets for the method presented.

An illustration of the reactor unit and the necessary flow and inlets and outlets is schematically given by FIG. 5. In this case, the flow of ambient air during the adsorption is along a direction orthogonal to the direction of flow of steam during the desorption. To allow that flow scheme using the layer structure of the adsorber structure the individual adsorber elements in a reactor according to this scheme need to be parallel to the paper plane.

Figure 6:
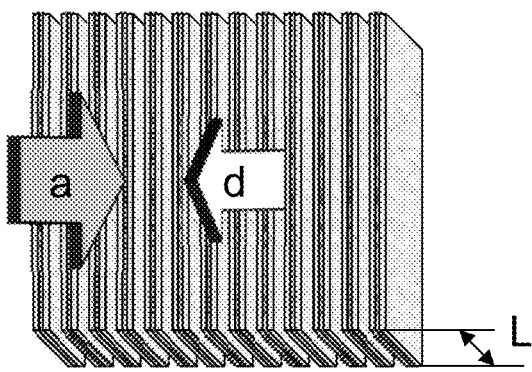
FIG. 6 shows a schematic of the adsorber structure with the adsorber elements and subsequent parallel fluid passages in vertical orientation, with an indication of the axial, mostly horizontal flow direction of the multi-component flow during adsorption, and a horizontal counter-flow arrangement for the steam during purge.

In an embodiment 1, the adsorber structure is positioned such that the adsorber elements and parallel passages 7 are orientated vertically, illustrated in FIG. 6. In step 1, the sorbent layers are contacted with an adsorption flow a for a duration of 5 min to 40 min along a main flow direction perpendicular to the largest adsorber structure perimeter surface available, such that a through flow of air is possible along the parallel passages at a velocity of between 2 m/s to 9 m/s.

After this adsorption step 1, the reactor unit containing the adsorber structure is closed off in step 2. The pressure within the reactor unit is then reduced to a pressure between 50 mbar (abs) and 400 mbar(abs) in the evacuation step 3.

Subsequently, in the heat-up step 5 the adsorber structure is brought to a temperature between 60° C. and 110° C. by the injection of steam until the necessary reactor pressure is achieved to attain the desired adsorber structure temperature by condensation and adsorption of steam on the adsorber structure within 0.5 min to 15 min.

In the subsequent purge step 6, steam flows through the parallel passages in the same plane as the adsorption flow of step 1, either in the same flow direction or in the opposing direction (shown as d) at a velocity preferably between 0.3-1 m/s for a duration of 0.5 min to 15 min, purging the parallel passages of desorbed $CO_2$ in a ratio ranging from 4 to 40 moles of steam per mole of $CO_2$.

In a following step 7, the injection of steam is ceased and the reactor unit evacuated is to a pressure of 50-250 mbar (abs). In the final step 8, the reactor unit is opened to the ambient conditions before the cycle recommences with step 1.

Figure 7:
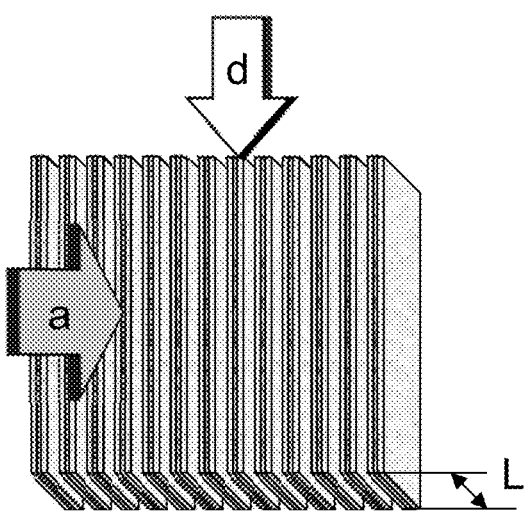
FIG. 7 shows a schematic of the adsorber structure with the adsorber elements and subsequent parallel fluid passages in vertical orientation, with an indication of the axial, mostly horizontal flow direction of the multi-component flow during adsorption, and a vertical orthogonal-flow arrangement for the steam during purge.

An embodiment 2, is essentially embodiment 1, but the flow of steam during step 5 and step 6 is introduced, such that it can pass fully through the parallel passages in a plane orthogonal to the adsorption flow, preferably at a velocity between 1 m/s and 6 m/s. For the vertical orientation of the adsorber elements and parallel passages, this essentially entails a steam flow from top to bottom or bottom to top, as indicated in FIG. 7.

Figure 8:
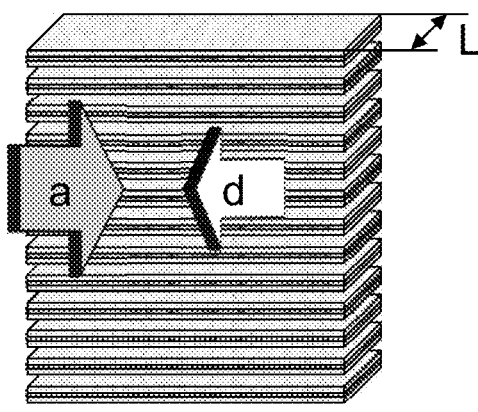
FIG. 8 shows a schematic of the adsorber structure with the adsorber elements and subsequent parallel fluid passages in horizontal orientation, with an indication of the axial, mostly horizontal flow direction of the multi-component flow during adsorption, and a horizontal counter-flow arrangement for the steam during purge.

An embodiment 3, shown in FIG. 8, is essentially embodiment 1, but where the adsorber structure is positioned such that the adsorber elements and parallel passages are orientated horizontally—as indicated in FIG. 8.

Figure 9:
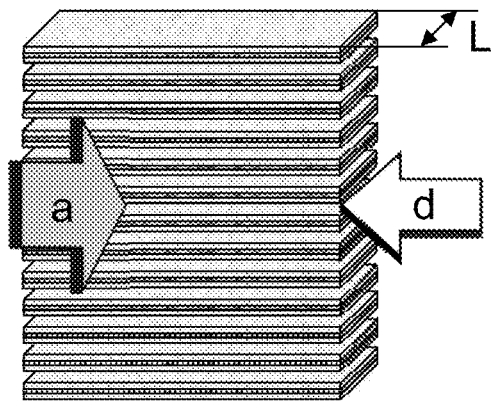
FIG. 9 shows a schematic of the adsorber structure with the adsorber elements and subsequent parallel fluid passages in horizontal orientation, with an indication of the axial, mostly horizontal flow direction (a) of the multi-component flow during adsorption, and a horizontal orthogonal-flow arrangement (d) for the steam during purge.

An embodiment 4, is essentially embodiment 3, but the flow of steam during step 5 and step 6 is introduced, such that it can pass fully through the parallel passages in a plane orthogonal to the adsorption flow, preferably at a velocity between 1 m/s and 6 m/s. For the vertical orientation of the adsorber elements and parallel passages, this essentially entails a steam flow from left to right or right to left, as indicated in FIG. 9.

In an embodiment 5 without evacuation, the adsorber structure is positioned such that the adsorber elements and parallel passages are orientated vertically, as illustrated in FIG. 6. In step 1, the sorbent layers are contacted with an adsorption flow a for a duration of 5 min to 40 min along a main flow direction perpendicular to the largest adsorber structure perimeter surface available, such that a through flow of air is possible along the parallel passages at a velocity of between 2 m/s to 9 m/s.

After this adsorption step 1, the reactor unit containing the adsorber structure is closed off in step 2.

Subsequently, in a steam purge step the adsorber structure is brought to a temperature between 60° C. and 110° C. by the injection of steam under ambient pressure until the local vapor pressure within the adsorber structure increases the adsorber structure temperature by condensation and adsorption of steam on the adsorber structure within 0.5 min to 30 min or 0.5-15 min, while the reactor outlet is open to allow the extraction of gases initially present after step 2 and then the extraction of $CO_2$ and steam. Steam flows through the parallel passages in the same plane as the adsorption flow of step 1, either in the same flow direction or in the opposing direction (shown as d) at a velocity preferably between 0.3-1 m/s for a duration of 0.5 min to 30 min or 0.5-15 min, purging the parallel passages of desorbed $CO_2$ in a ratio ranging from 4 to 40 moles of steam per mole of $CO_2$.

In the final step 8, the reactor unit is opened to the ambient conditions before the cycle recommences with step 1.

Figure 10:
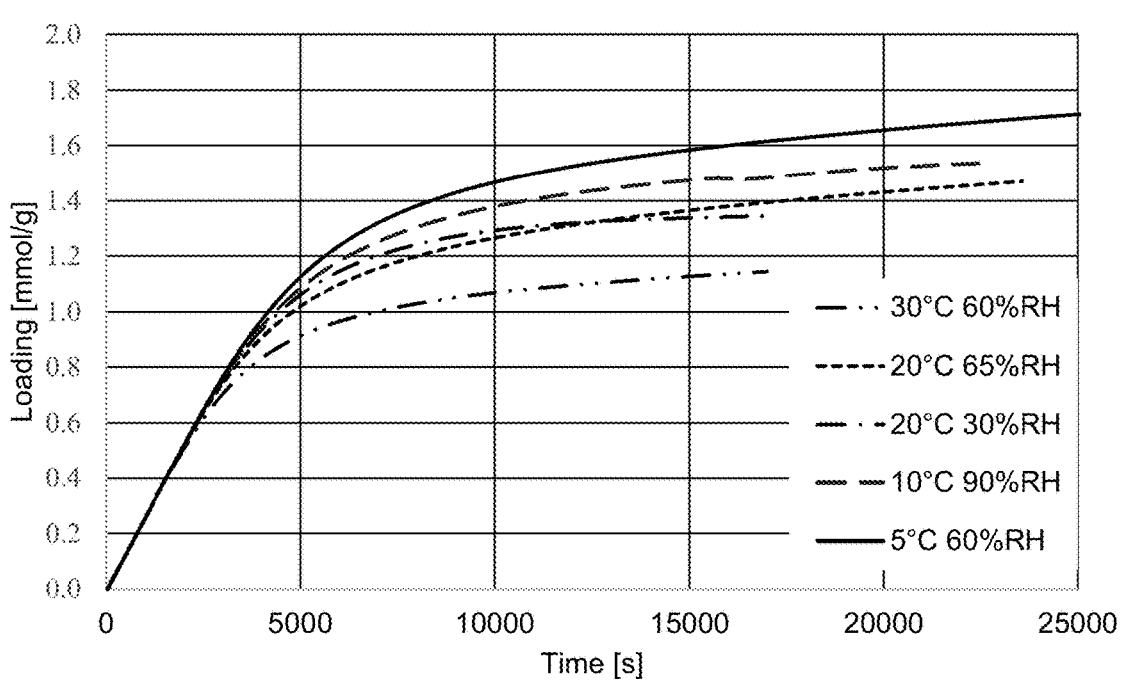
FIG. 10 shows laboratory testing results of an adsorber structure (1"×1/2" by 40 mm) for different adsorption conditions, delivering 1.2-1.6 mmol/g.

Embodiment 5 can equally be carried out using the flow conditions and adsorber structure arrangement of embodiments 2-4, again without evacuation FIG. 10 shows loading curves gained from extensive hot air purge at 95° C. after adsorption at the conditions indicated on the figure on a lab-scale breakthrough analyzer and is considered to indicate the maximum potential for such an adsorber structure with current sorbent materials embedded in the first and/or second sorbent layer, reaching loadings of 1.2 to 1.6 mmol/g.

Figure 11:
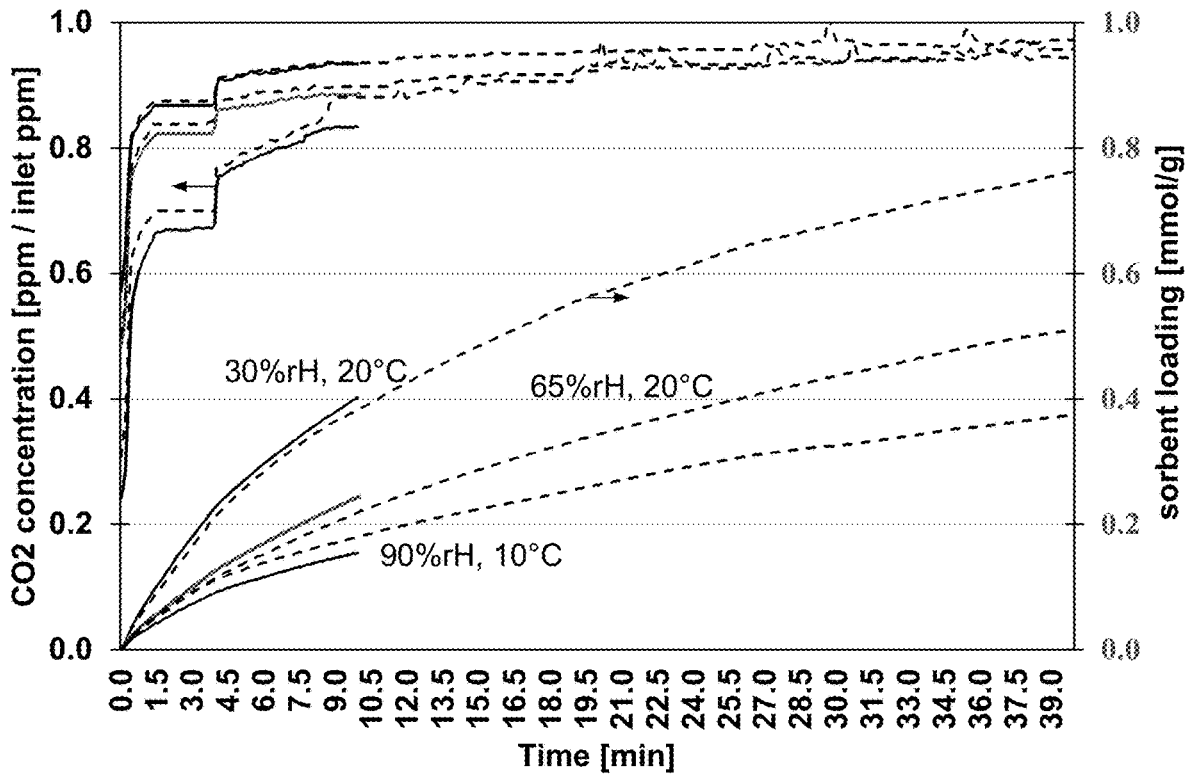
FIG. 11 shows average breakthrough curves (top curves) and average $CO_2$-loading (bottom curves) for experimental operation of embodiment 1, with an adsorber structure (360 mm×360 mm by 100 mm) with parallel passages in vertical orientation and a process including evacuation steps to below 200 mbar(abs)

Successful operation of embodiment 1 is shown in FIG. 11. At an adsorption through-flow velocity within the parallel passages of approximately 4 m/s an average $CO_2$ yield of 0.4 mmol/g was achievable within 10 min at sufficiently dry ambient conditions, increasing to 0.8 mmol/g after 40 min. The evacuation pressure for step 3 and step 7 was 150 mbar(abs), the pressure after heat-up step 5 of 2 min and during purge step 6 of 3 min lay between 850 and 950 mbar(abs). The steam flow during these steps took the same path as the initial adsorption flow, at a (mean) velocity of 0.72 m/s within the parallel passages.

Figure 12:
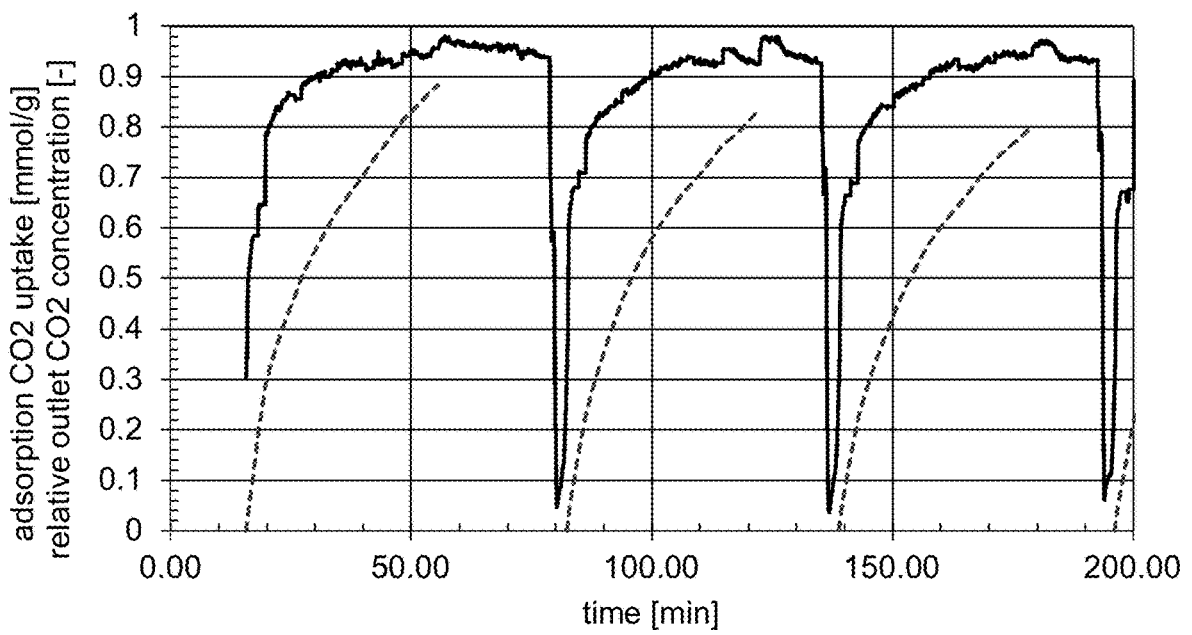
FIG. 12 shows relative breakthrough curves (top curves) and $CO_2$-loading (bottom curves) for experimental operation of embodiment 2, with an adsorber structure (360 mm×360 mm by 100 mm) with parallel passages in vertical orientation and a process without any evacuation steps.

Successful operation of embodiment 5 is shown in FIG. 12. Three cycles according to embodiment 5 were run in sequence and yielded between 0.8 and 0.9 mmol/g of $CO_2$.

Figure 13:
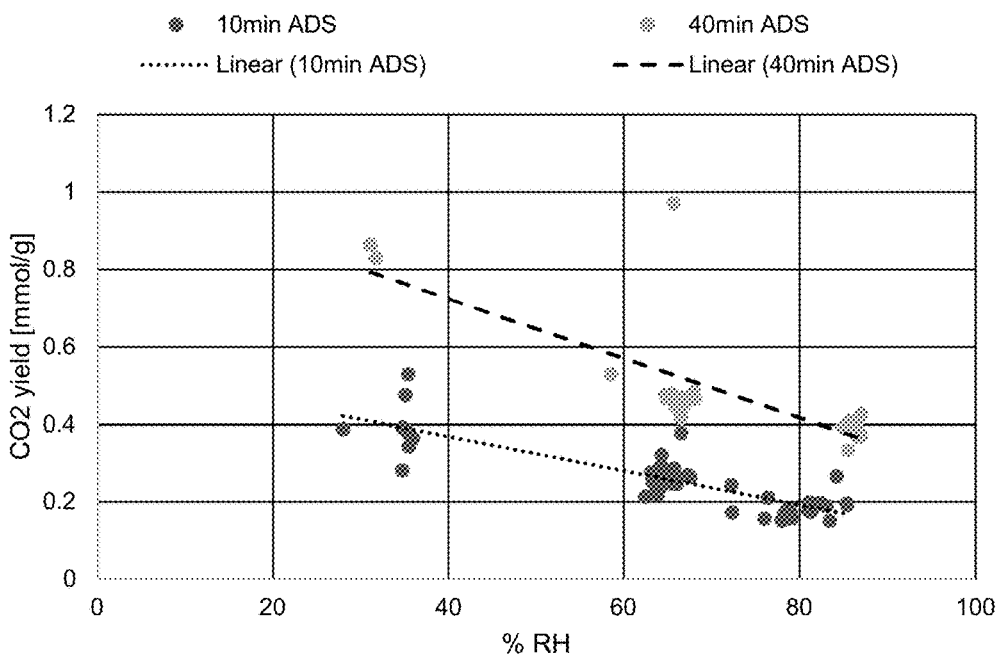
FIG. 13 shows a summary of experimental results with an insufficiently long adsorber structure according to embodiment 1.

A summary of experimental results from embodiment 1 is given in FIG. 13, indicating successful cyclical operation over at least 10 cycles for several ambient conditions. The results are very promising and considerable improvements are expected with an optimization of the adsorber structure and sorbent material for DAC purposes.

Figure 14:
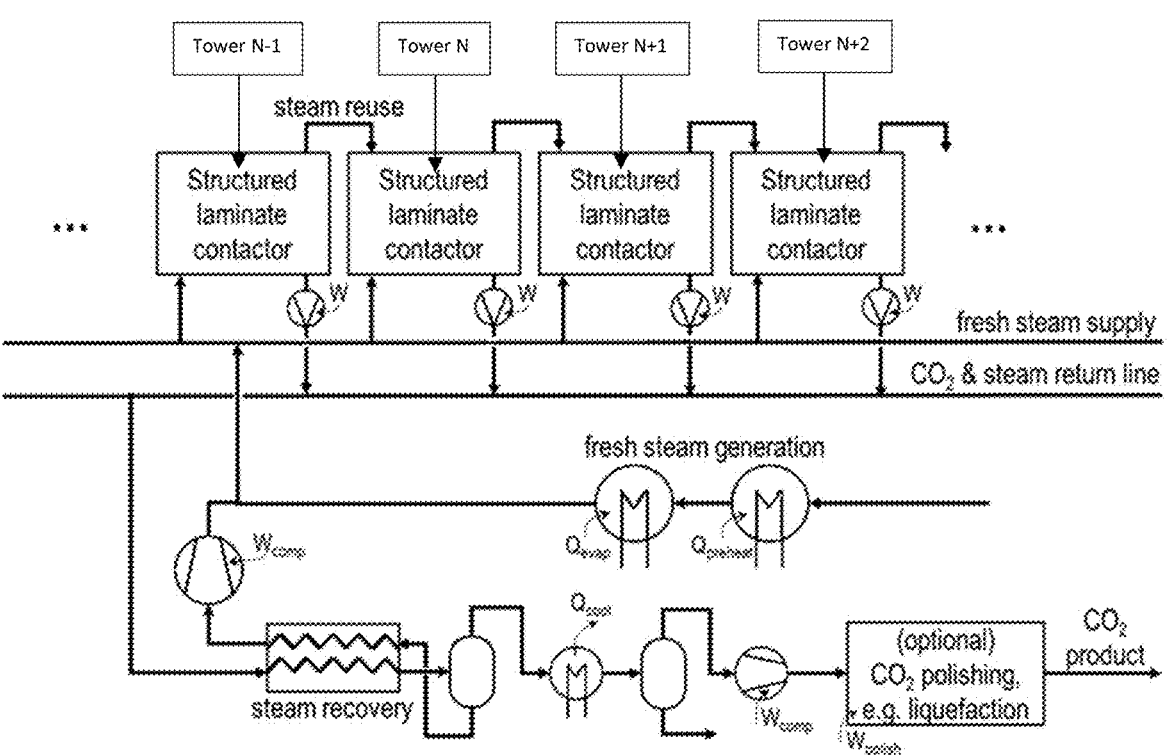
FIG. 14 shows a schematic plant layout as can be used for carrying out the proposed method

FIG. 14 shows a general scheme of a plant layout suitable and adapted for carrying out the method described.

The plant comprises T major units as required for the desired plant capacity.

Each unit comprises X subunits, where X:1 is the relation between total cycle time and the time required for desorption/regeneration. For example, in tower N there is an adsorber structure with 6 subunits, one of them is desorbing and the rest of them is adsorbing.

Each subunit comprises one or multiple reaction chambers acting in unison and undergoing the same process steps.

Each subunit can be sealed off mechanically from the surrounding ambient by way of a valve, flap or door.

Each subunit can be in size similar to a 40 foot shipping container, primarily concerning length (12.2 m) and height (2.6 m).

Each reaction chamber contains the adsorber structure, which in this case is the above laminate stack. To the extent that the inflow to the adsorber is the largest open surface provided by the subunit, therefore less than length×height (12.2 m×2.6 m).

For example, considering six reaction chambers, a viable inlet section is six adsorber structure inlets of length 1.6 m to 2 m by height 1.6 m to 2.4 m.

The volume of the adsorber structure behind this inlet for the entire subunit ranges from 1.5 m3 (1.6 m×1.6 m×6×0.1 m) to 60 m3 (just more than 2 m×2.4 m×6×2 m).

The adsorber structure mass of one subunit is in the range 75 kg to 3000 kg, depending on the optimal configuration.

Each subunit is supplied with steam in the range of 6 tons to 20 tons per hour. An adsorption airflow can be generated at each subunit of 100,000 m3/h to 650,000 m3/h.

Specific Example 1

The results shown in FIGS. 11, 12 and 13 were obtained on an experimental rig in April and May of 2020. The adsorber structure was operated as given in embodiment 1 and FIG. 6, with dimensions of 360 mm×360 mm×100 mm, where the gas flow inlet and outlet was the respective largest surface given by the 360 mm by 360 mm area. The adsorber elements comprised at least one layer of functionalized silica for $CO_2$ adsorption, and had a width of approximately 0.25 mm. The spacer employed provided a spacing between parallel adsorber elements of approximately 0.5 mm. The entire adsorber structure consisted therefore of approximately 480 individual adsorber elements.

The operational embodiment with results shown in FIG. 11 employed an adsorption step 1 with duration of 10 min and 40 min and flow velocity within the parallel passages of 4 m/s. In step 2 and 3, the reactor unit was isolated and evacuated to 150 mbar(abs). In the heat-up step 5, steam injection increased chamber pressure to 950 mbar(abs) within less than 2 min, before an steam purge step 6 with flow velocities in the channel of 0.72 m/s at a pressure of 850 mbar(abs) is conducted for 3 min. In step 7, the injection of steam is ceased and the pressure in the reactor unit is reduced to 150 mbar(abs). Before the unit is re-pressurized to ambient in step 8.

The operational embodiment with results shown in FIG. 11 employed an adsorption step 1 with duration of 40 min and flow velocity within the parallel passages of 4 m/s. In step 2, the reactor unit was isolated but no evacuation occurred. No dedicated heat-up step was foreseen; instead, an immediate steam purge step 6 with flow velocities in the channel of 0.72 m/s at ambient pressure is conducted for 6 min resulting in simultaneous heat-up and purge of the adsorber structure. The injection of steam is ceased and the isolation of the unit broken before the unit again recommences with adsorption.

As pointed out above, the pressure drop across such an adsorber structure can be estimated by the following equation:

$$\frac{\Delta P}{L} = K \cdot (U_{inlet}) \cdot (b_{spacer})^{-2.27}$$

Here:
$\Delta P$ is the pressure drop across the structure in Pa
L is the length of the parallel passage the gas flows across in cm
K is a roughness factor to be determined experimentally, typically in the range of 1 to 10.
$U_{inlet}$ is the velocity on the inlet plane of the adsorber structure (not yet the velocity in the parallel passage) in m/s.
$b_{spacer}$ is the height of the spacers determining the width of the parallel passages in mm.

Figure 15:
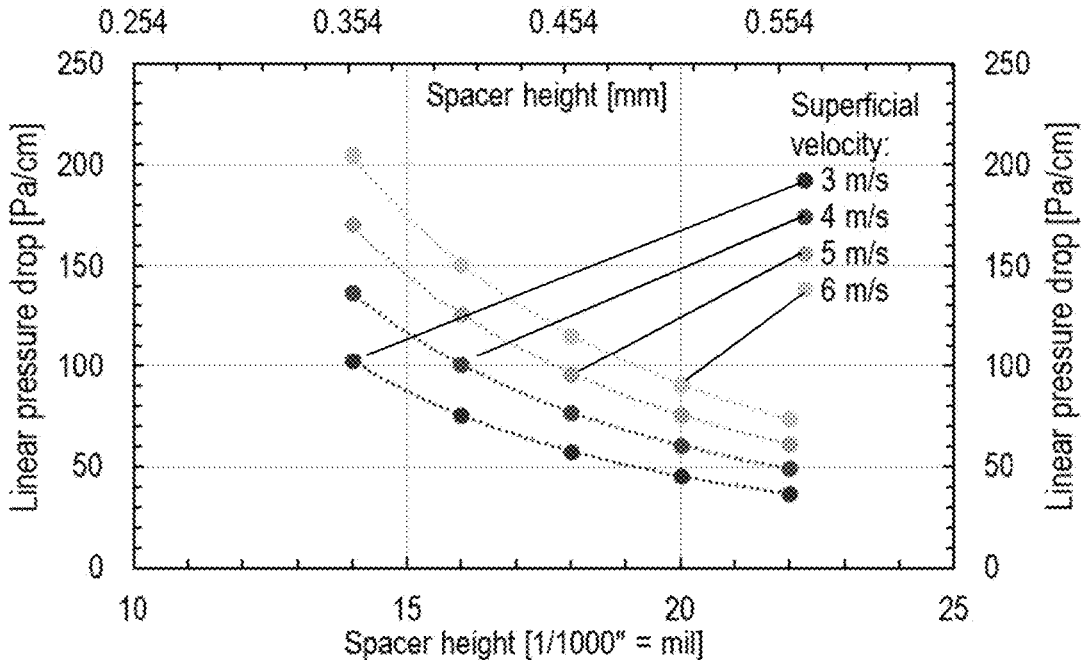
FIG. 15 shows the pressure drop measured and calculated for various spacer heights and superficial velocities.

FIG. 15 indicates such pressure drop calculated for various spacer heights and superficial velocities.

An exemplary configuration for flue gas capture entails a system with length of 2 m, and spacing of 0.35 mm at a superficial velocity of 5 m/s. Such a configuration results in a pressure drop of well above 3 bar. Such a pressure drop might be feasible for flue gas system operating at elevated pressures, but not for DAC applications.

Figure 16:
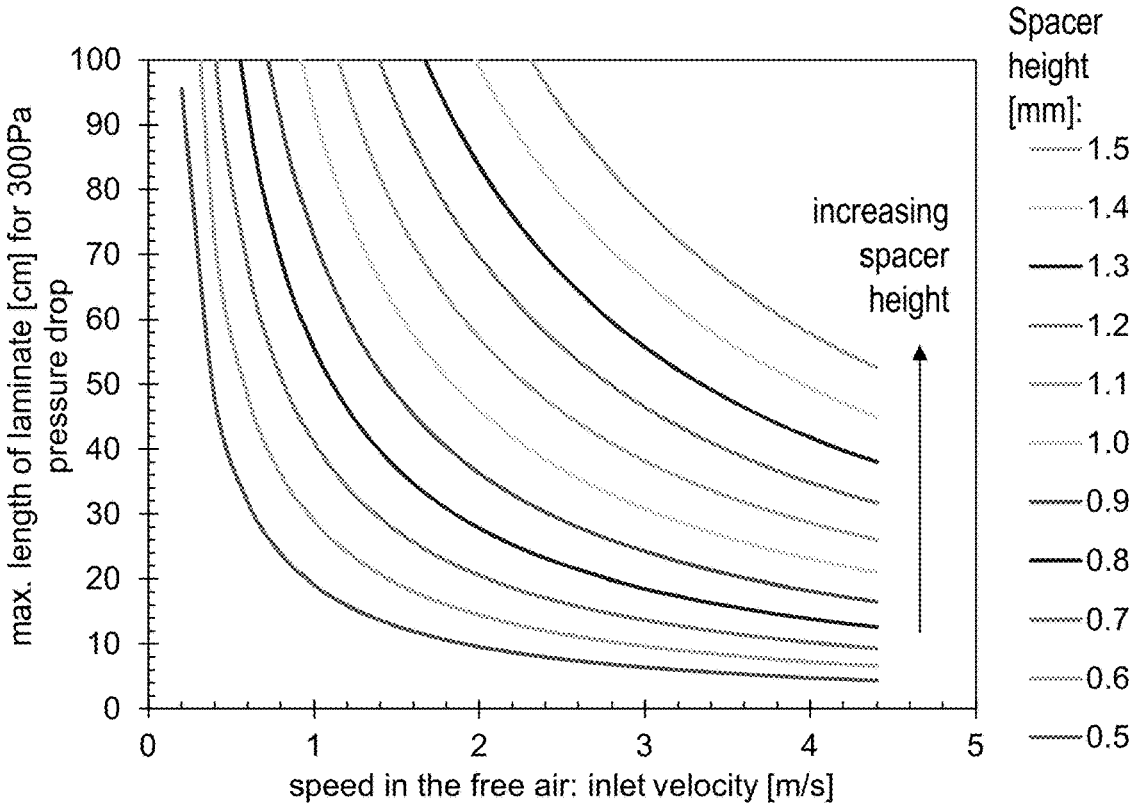
FIG. 16 shows, for different spacer heights in mm, the maximum length of the laminate as a function of the speed in the free air for a pressure drop of 300 Pa.

DAC applications are generally limited by the viable pressure drop of commercially available fan and ventilator systems. For axial fans, this leads to a maximum pressure drop around 300 Pa is substantial volume flows are still to be achieved, and for radial fans this can be increased to 600 Pa or 700 Pa, at most up to 1200 Pa. Using this correlation, a map of the maximum flow path and therefore laminate length can be determined for a given adsorber type and spacer height as a function of the inlet flow velocity, also termed the superficial velocity, or velocity in free air to achieve a target pressure drop across the adsorber, see FIG. 16.

Figure 17:
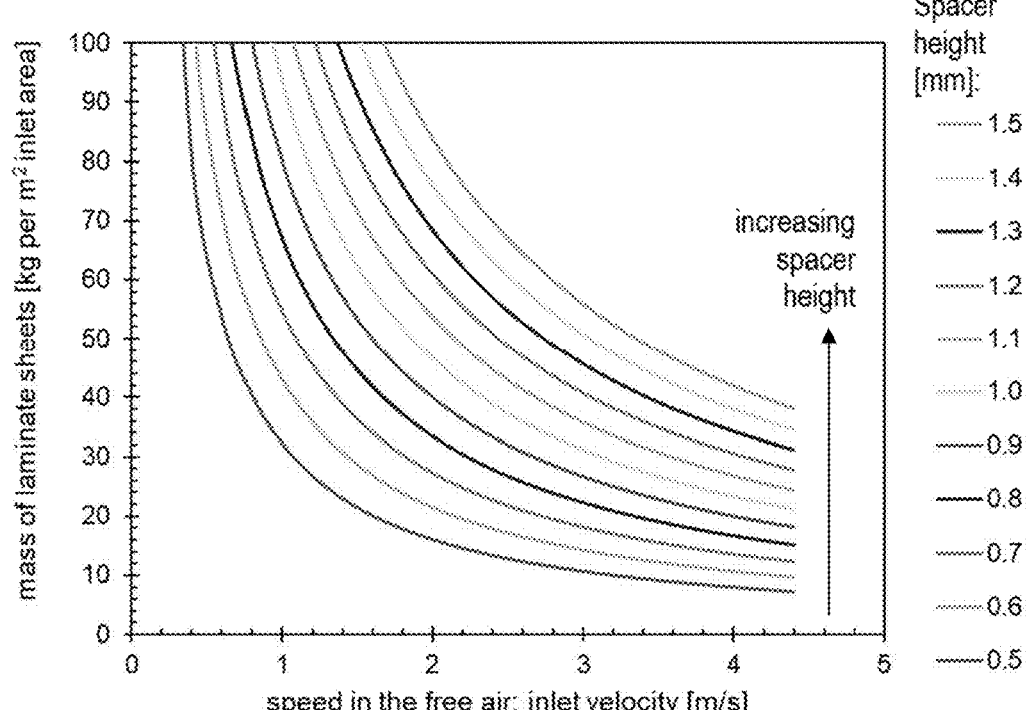
FIG. 17 shows, for different spacer heights in mm, the mass of laminate sheets per square meter inlet area as a function of the speed in the free air (inlet velocity prior to parallel passages) for a pressure drop of 300 Pa.

Given this length of the adsorber structure, the thickness and density of individual adsorber sheets as well as the height of the spacers, a mass of adsorber structure per inlet area can be determined (see also FIG. 17):

$$\frac{m}{A} = L \cdot \rho_{element} \cdot \frac{b_{element}}{b_{element} + b_{spacer}}$$

Figure 18:
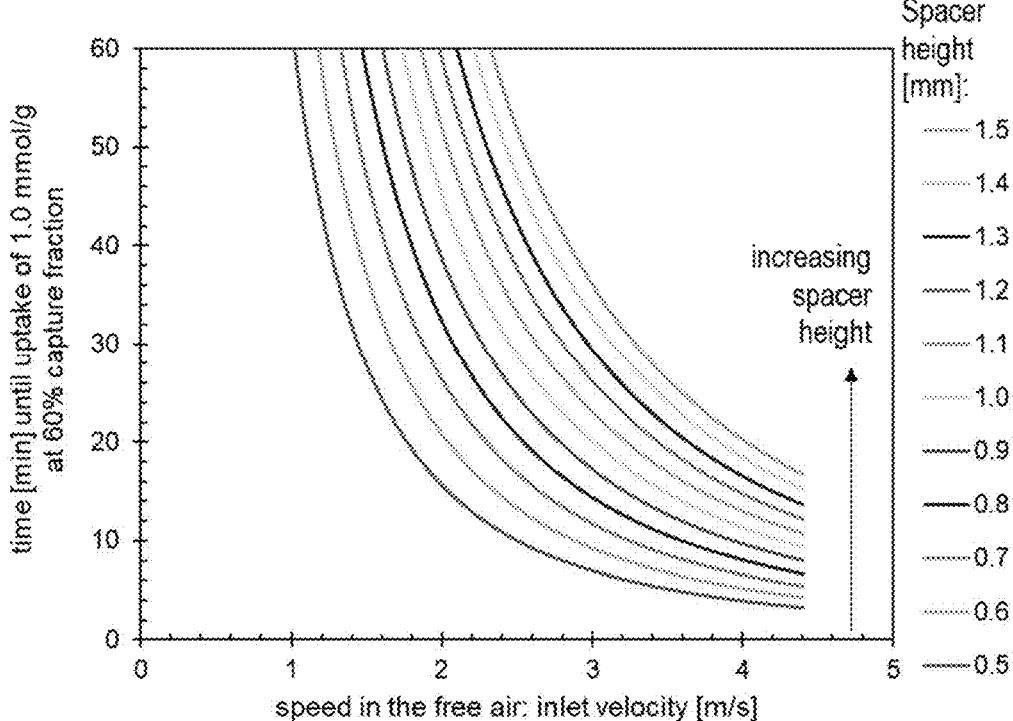
FIG. 18 shows, for different spacer heights in mm, the time until uptake of 1 mmol/g as a function of speed in the free air for a pressure drop of 300 Pa and capture fraction of 60%.

Additionally, by knowing the flow and assuming a capture fraction, that is portion of the total $CO_2$ passing the contactor that is captured, in this case 60%, a time until a certain loading of the sorbent is achieved can be estimated (see also FIG. 18).

Figure 19:
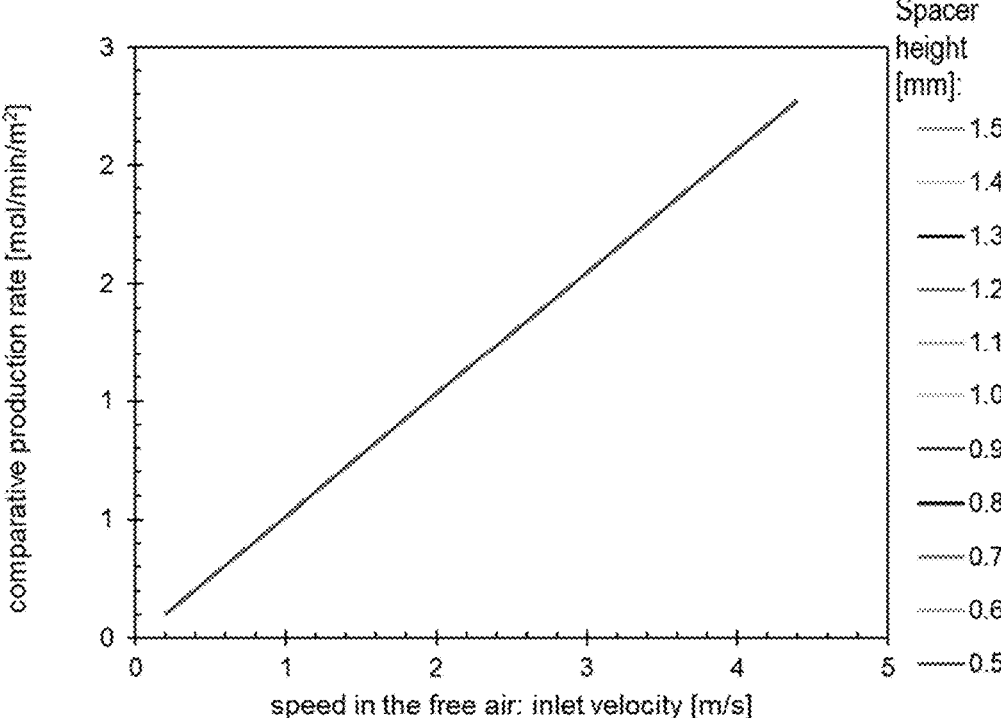
FIG. 19 shows a comparative production rate as a function of the speed in free air for different spacer heights in mm for a pressure drop of 300 Pa.

The ratio of the mass of adsorber structure and achieved $CO_2$ loading per unit area divided by the time required for adsorption is an indicative and directly comparable parameter for the $CO_2$ production rate, see FIG. 19.

This is the same for all spacer heights, as it is assuming a constant capture fraction for the ingoing air, and therefore linearly increases with velocity. This assumption would be verified or adjusted once specific kinetic and geometric parameters of the sorbent and structure are known. Another parameter is required to adjudge which spacer height to best use for such a system. This can be achieved by analyzing the kinetics involved in the adsorption process. This is done by comparing a characteristic time of advection $T_{adv}$—which describes the time frames associated with the flow—with a characteristic time of diffusion $T_{diff}$—which describes the time frames associated with the diffusion of $CO_2$ into the sorbent layer.

Here $$\tau_{adv} = \frac{L}{U_{interstitial}} = \frac{L}{U_{inlet}} \cdot \frac{b_{spacer}}{b_{element} + b_{spacer}}$$

And the characteristic time of diffusion is the sum of the characteristic time of film diffusion and pore diffusion into the adsorptive layer:

$$\tau_{diff} = \tau_{film} + \tau_{pore}$$

Where the characteristic time of film diffusion is given as a function of the spacer height and the film mass transfer coefficient $k_f$:

$$\tau_{film} = \frac{b_{spacer}/2}{k_f}$$

The characteristic time of pore diffusion is given as a function of the element thickness and the pore mass transfer coefficient $k_p$:

$$\tau_p = \frac{b_{element}/2}{k_p}$$

Figure 20:
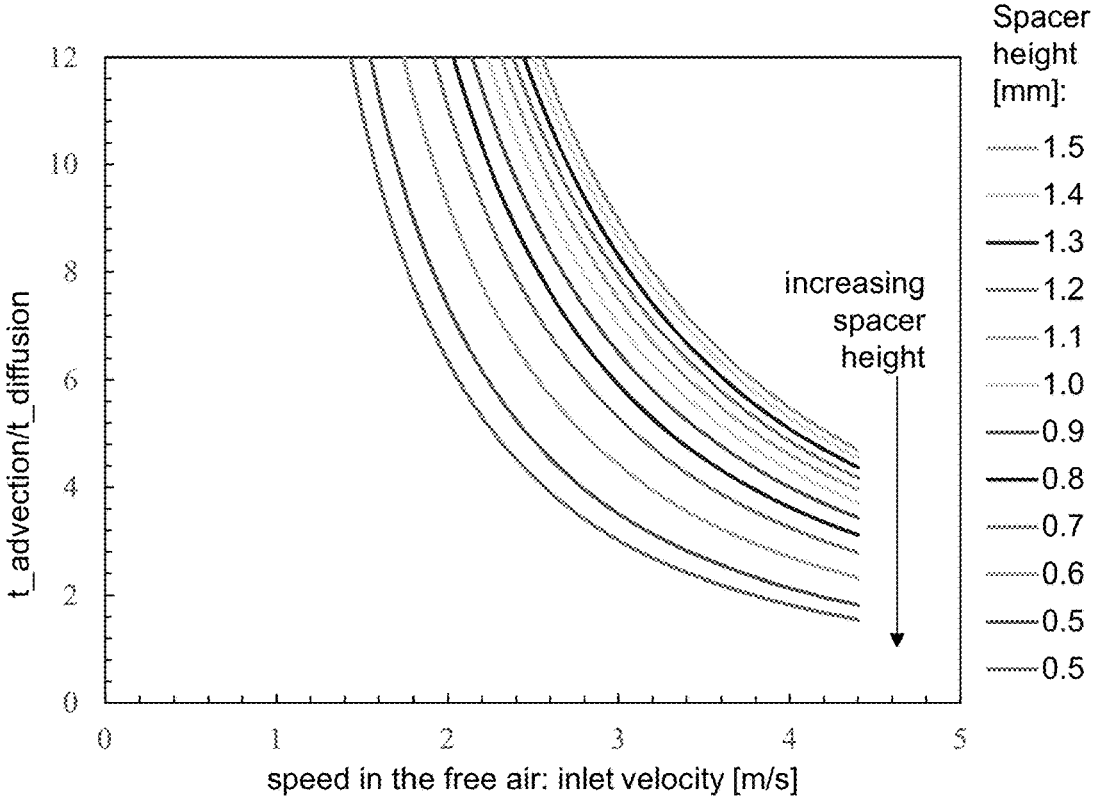
FIG. 20 shows the ratio of characteristic time of advection and diffusion as a function of the speed in the free air for different spacer heights for a pressure drop of 300 Pa.

With these correlations, an analysis of the ratio of advection to diffusion characteristic times can be carried out, as shown in FIG. 20.

The important aspect here is, that larger spacing solutions, that are in this case still attributed to the length assigned to maintain a desired pressure drop, show a smaller advection to diffusion time ratio, indicating more time for diffusion compared to smaller spacer heights associated with shorter beds. The efficiency of the capture process during adsorption is largely determined and limited by diffusion into the sorbent.

Figure 21:
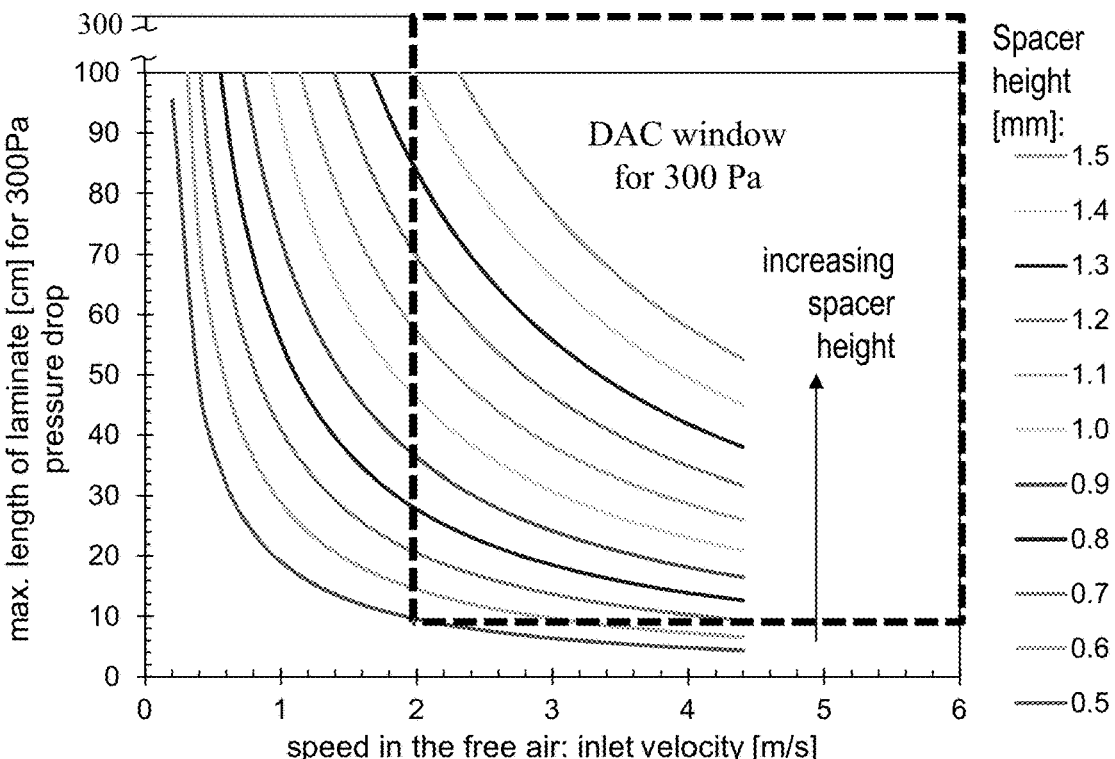
FIG. 21 shows the maximum length of laminate as a function of the speed in the free air for different spacer heights and the DAC window for a pressure drop of 300 Pa.

Therefore, the above realization shows for DAC, that larger spacer heights and longer beds are producing better adsorption results than a theoretically similar solution with tighter spacing and shorter beds. Therefore, DAC applications (see FIG. 21) are optimally operated at larger spacer heights, the technically feasible range seemingly between 0.4 and 3 mm, and technically realizable inlet velocities of 2-6 m/s, resulting in bed lengths of 100 to 3000 mm. At this stage, another factor to be considered beside the practical and technical implementation is to be mentioned—the cost of such adsorber structures: larger spacing structures inherently require more initial sorbent material and the increased investment cost drives the trade-off from the other direction in most practical implementations.

Specific Example 2

An adsorber structure based on parallel passages from which the maximum capture capacity is sought must consider a number of factors: allowable pressure drop, sorbent capacity, effective sorbent density and kinetics of capture. A sorbent for example having high capacity requires a lot of air to fully load which correspondingly requires wide channels to respect the pressure drop limitation. Correspondingly, such systems will have likely lower sorbent density limiting the potential capture capacity.

Figure 22:
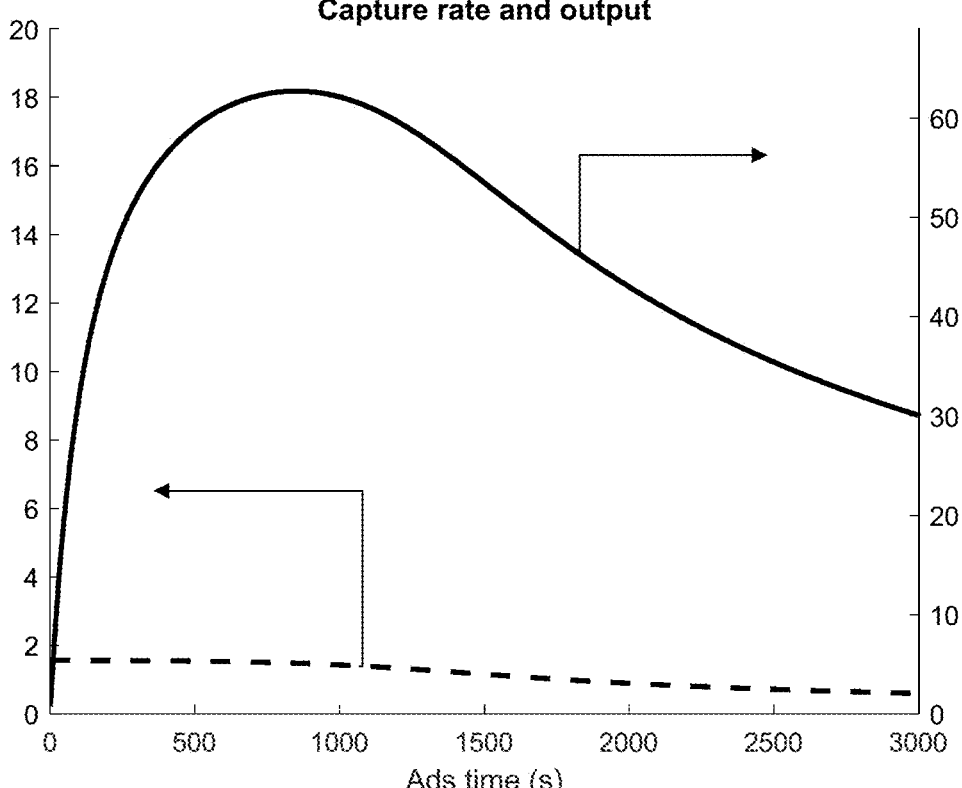
FIG. 22 shows the capture rate and the capture capacity as a function of the adsorption time for a given set of parameters.

In this example associated with FIG. 22, the operation of an adsorber structure along this invention is numerically investigated for a direct air capture process with a particular sorbent and adsorber structure. A limiting pressure drop of 750 Pa is assumed acceptable for a specific sorbent material having a surface density of 230 g/m2, a parallel passage spacing width $b_{spacer}$ of 1.7 mm, an inflow air speed of 7 m/s in the passages and a length L of 1.2 m.

The capture process was numerically simulated with a linear driving force model and mass transfer formulations for CO2 air and the optimum capture capacity was determined (in tonsCO2capture/m2 inlet air/yr) by varying the adsorption duration with an associated desorption process duration. It is seen that the optimum adsorption process duration for this case can be found at 840s (14 min) and corresponds to an average capture rate of just under 2 mmol/g/h. This point falls well within the ranges of interest specified in this invention.

LIST OF REFERENCE SIGNS

| 1 | first sorbent layer |
|---|---|
| 2 | second sorbent layer |
| 3a | porous support layer |
| 3b | carrier layer |
| 4 | spacer elements |
| 5 | individual adsorber element |
| 6 | complete adsorber structure |
| 7 | fluid passage, bound on one side by a first sorbent layer ($1^N$) from one adsorber element, and a second sorbent layer ($2^{N+1}$) from a neighboring adsorber element |
| A | inlet area |
| a | flow direction of the multi-component flow during adsorption |
| $b_{element}$ | element thickness of the adsorber element |
| $b_{spacer}$ | spacing width |
| d | flow direction of the steam flow during desorption |
| $\Delta P$ | pressure drop across the adsorber structure |
| $K_{surface}$ | roughness factors |
| $K_{linear}$ | linear roughness factors |
| $k_f$ | film mass transfer coefficient |
| $k_p$ | pore mass transfer coefficient |
| L | length of the adsorber element along the flow-through direction in adsorption |
| m | mass of the adsorber structure |
| $\rho_{element}$ | density of individual adsorber sheets |
| $T_{adv}$ | characteristic time of advection |
| $T_{diff}$ | characteristic time of diffusion |
| $T_{film}$ | characteristic time of film diffusion |
| $T_{pore}$ | characteristic time of pore diffusion |
| $U_{inlet}$ | velocity on the inlet plane of the adsorber structure |
| $U_{interstitial}$ | velocity between the plates in the channels |

The invention claimed is:

1. A method for separating gaseous carbon dioxide from ambient atmospheric air containing said gaseous carbon dioxide as well as further gases different from gaseous carbon dioxide, by cyclic adsorption/desorption using at least one sorbent material adsorbing said gaseous carbon dioxide, using a unit containing an adsorber structure with said at least one sorbent material, the adsorber structure being able to sustain a temperature of at least 60° C. for the desorption of at least said gaseous carbon dioxide and the unit being openable to flow-through of the ambient atmospheric air and for contacting it with the at least one sorbent material for the adsorption step, wherein the adsorber structure comprises an array of individual adsorber elements, each adsorber element comprising at least one support layer and at least one sorbent layer comprising the at least one sorbent material, where said at least one sorbent material offers selective adsorption of $CO_2$ over other major non-condensable gases in air in the presence of moisture or water vapor, wherein the adsorber elements in the array are arranged essentially parallel to each other and spaced apart from each other forming parallel fluid passages for flow-through of at least one of ambient atmospheric air and steam, wherein the method comprises at least the following sequential and in this sequence repeating steps (a)-(e):

(a) contacting said ambient atmospheric air with the at least one sorbent material to allow at least said gaseous carbon dioxide to adsorb on the at least one sorbent material by flow-through through said parallel fluid passages under ambient atmospheric pressure conditions and ambient atmospheric temperature conditions in an adsorption step;

(b) isolating said at least one sorbent material with adsorbed carbon dioxide in said unit from said flow-through while maintaining the temperature in the at least one sorbent material;

(c) injecting a stream of saturated or superheated steam by flow-through through said parallel fluid passages and thereby inducing an increase of the temperature of the at least one sorbent material to a temperature between 6° and 110° C., starting the desorption of $CO_2$;

(d) extracting at least the desorbed gaseous carbon dioxide from the unit and separating gaseous carbon dioxide from steam by condensation in or downstream of the unit, while still contacting the at least one sorbent material with steam by injecting and/or partial circulating saturated or superheated steam into said unit, thereby flushing and purging both steam and $CO_2$ from the unit at a molar ratio of steam to carbon dioxide between 4:1 and 40:1, while regulating at least one of the extraction and the steam supply to essentially maintain the temperature in the at least one sorbent material at the end of the preceding step (c) or to essentially maintain the pressure in the at least one sorbent material at the end of the preceding step (c), or both;

(e) bringing the at least one sorbent material to ambient atmospheric temperature conditions;

wherein in step (a) the flow speed of the ambient atmospheric air through the adsorber structure is in the range of 2-9 m/s, and wherein at least in step (d) the flow speed of the steam through the adsorber structure is at least 0.2 m/s, wherein essentially exclusive use or fully exclusive use of steam is made in steps (c) and (d) for the delivery of heating energy during the desorption process.

2. The method according to claim 1, wherein at least in step (d) the flow speed of the steam through the adsorber structure is in the range of 0.3-6 m/s.

3. The method according to claim 1, wherein in step (a) the specific flow rate of the ambient atmospheric air through the adsorber structure, as a function of the mass of the at least one sorbent material, is in the range of 20-10,000 m3/h/kg, or wherein in step (a) the specific flow rate of the ambient atmospheric air through the adsorber structure, as a function of the volume of the at least one sorbent material, is in the range of 4,000-500,000 m3/h/m3, or wherein at least in step (d) the specific flow rate of the steam through the adsorber structure, as a function of the mass of the at least one sorbent material, is in the range of 1-500 kg/h/kg, or wherein at least in step (d) the specific flow rate of the steam through the adsorber structure, as a function of the volume of the at least one sorbent material, is in the range of 200-15,000 kg/h/m3.

4. The method according to claim 1, wherein carbon dioxide capture fraction, defined as the percentage of carbon dioxide captured from the ambient atmospheric air in said adsorption step by the at least one sorbent material is in the range of 10-75%, or wherein the amount of carbon dioxide captured on the at least one sorbent material per gram sorbent material is at least 0.1 for an adsorption time span of at least 5, or wherein the normalized amount of carbon dioxide captured on the at least one sorbent material per gram sorbent material per hour is in the range of 0.5-10 mmol/g/h.

5. The method according to claim 1, wherein each adsorber element comprising, as a support layer, a central carrier layer or a porous support layer and on both sides thereof at least one porous or permeable sorbent layer with chemically attached carbon dioxide capture moieties.

6. The method according to claim 1, wherein the adsorber elements in the array are spaced apart by spacer elements from each other forming said parallel fluid passages for flow-through of at least one of ambient atmospheric air and steam, or wherein a spacing ($b_{spacer}$) between the adsorber elements is in the range of 0.2-5 mm, or wherein each adsorber element has the form of a plane with a thickness ($b_{element}$) in the range of 0.1-1 mm.

7. The method according to claim 1, wherein said unit is evacuable to a vacuum pressure of 400 mbar(abs) or less, and wherein step (b) includes isolating said at least one sorbent material with adsorbed carbon dioxide in said unit from said flow-through while maintaining the temperature in the at least one sorbent material and then evacuating said unit to a pressure in the range of 20-400 mbar(abs), wherein in step (c) injecting a stream of saturated or superheated steam is also inducing an increase in internal pressure of a reactor unit, and wherein step (e) includes bringing the at least one sorbent material to ambient atmospheric pressure conditions and ambient atmospheric temperature conditions.

8. The method according to claim 1 carried out for direct air capture.

9. The method according to claim 2, wherein at least in step (d) the flow speed of the steam through the adsorber structure is in the range of 0.3-1.0 m/s for a case where the flow of the ambient atmospheric air in step (a) and the flow of the steam in step (d) are essentially along the same flow path, or wherein at least in step (d) the flow speed of the steam through the adsorber structure is in the range of 1-6 m/s for a case where the flow of the ambient atmospheric air in step (a) and the flow of the steam is step (d) are along different flow path flows, or for a case where the flow of steam in step (d) is essentially orthogonal to that of the ambient atmospheric air in step (a).

10. The method according to claim 1, wherein in step (a) the specific flow rate of the ambient atmospheric air through the adsorber structure, as a function of the mass of the at least one sorbent material, is in the range of 100-7,000 m3/h/kg, or wherein in step (a) the specific flow rate of the ambient atmospheric air through the adsorber structure, as a function of the volume of the at least one sorbent material, is in the range of 10,000-300,000 m3/h/m3 or wherein at least in step (d) the specific flow rate of the steam through the adsorber structure, as a function of the mass of the at least one sorbent material, is in the range of 50-250 kg/h/kg, or wherein at least in step (d) the specific flow rate of the steam through the adsorber structure, as a function of the volume of the at least one sorbent material, is in the range of 500-10,000 kg/h/m3.

11. The method according to claim 1, wherein carbon dioxide capture fraction, defined as the percentage of carbon dioxide captured from the ambient atmospheric air in said adsorption step by the at least one sorbent material is in the range of 30-60%, or wherein the amount of carbon dioxide captured on the at least one sorbent material per gram sorbent material is in the range of 0.1-1.8 mmol/g for an adsorption time span of at least 5 or at least 10 minutes, or wherein a normalized amount of carbon dioxide captured on the at least one sorbent material per gram sorbent material per hour is in the range of 1-6 mmol/g/h.

12. The method according to claim 1, wherein each adsorber element comprises as the support layer a central carrier layer or a porous support layer and on both sides thereof at least one porous and/or permeable sorbent layer with chemically attached carbon dioxide capture moieties, in the form of amine groups, wherein the porous sorbent layer is in the form of a woven or non-woven, fibre based structure, wherein said carrier or porous support layer can be based on at least one of metal, polymer, carbon, carbon molecular sieve and graphene material.

13. The method according to claim 1, wherein a spacing ($b_{spacer}$) between the adsorber elements is in the range of 0.4-3 mm, or wherein each adsorber element has the form of a plane with a thickness ($b_{element}$) in the range of 0.2-0.5 mm.

14. The method according to claim 1, wherein said unit is evacuable to a vacuum pressure of 400 mbar(abs) or less, and wherein step (b) includes isolating said at least one sorbent material with adsorbed carbon dioxide in said unit from said flow-through while maintaining the temperature in the at least one sorbent material and then evacuating said unit to a pressure in the range of 20-400 mbar(abs), wherein in step (c) injecting a stream of saturated or superheated steam is also inducing an increase in internal pressure of a reactor unit, and wherein step (e) includes bringing the at least one sorbent material to ambient atmospheric pressure conditions and ambient atmospheric temperature conditions, and wherein after step (d) and before step (e) the following step is carried out:

(d1) ceasing injection and, if used, circulation of steam, and evacuation of the unit to pressure values between 20-500 mbar(abs), or in the range of 50-250 mbar(abs) in the unit, thereby causing evaporation of water from the at least one sorbent material and both drying and cooling the at least one sorbent material, wherein step (e) is carried out exclusively by contacting said ambient atmospheric air with the at least one sorbent material under ambient atmospheric pressure conditions and ambient atmospheric temperature conditions to evaporate and carry away water in the unit and to bring the at least one sorbent material to ambient atmospheric temperature conditions, or wherein said ambient atmospheric air in step (a) flows through said parallel fluid passages essentially along a first direction, and wherein said steam in at least one or both of steps (c) and (d) flows essentially along that same first direction or a direction essentially opposite to said first direction, or wherein said ambient atmospheric air in step (a) flows through said parallel fluid passages essentially along a first direction, and wherein said steam at least one or both of steps (c) and (d) flows essentially along a direction orthogonal to said first direction through said parallel fluid passages.

* * * * *